US008520093B2

(12) United States Patent
Nanu et al.

(10) Patent No.: US 8,520,093 B2
(45) Date of Patent: *Aug. 27, 2013

(54) FACE TRACKER AND PARTIAL FACE TRACKER FOR RED-EYE FILTER METHOD AND APPARATUS

(75) Inventors: Florin Nanu, Bucharest (RO); Eran Steinberg, San Francisco, CA (US); Peter Corcoran, Galway (IE); Alexei Pososin, Galway (IE); Petronel Bigioi, Galway (IE); Alexandru Drimbarean, Galway (IE); Stefan Petrescu, Bucharest (RO); Mihnea Gangea, Bucharest (RO); Adrian Capata, Bucharest (RO); Mihai Ciuc, Bucharest (RO); Adrian Zamfir, Bucharest (RO)

(73) Assignee: DigitalOptics Corporation Europe Limited, Galway (IE)

( * ) Notice: Subject to any disclaimer, the term of this patent is extended or adjusted under 35 U.S.C. 154(b) by 449 days.

This patent is subject to a terminal disclaimer.

(21) Appl. No.: 12/551,335

(22) Filed: Aug. 31, 2009

(65) Prior Publication Data

US 2010/0053368 A1 Mar. 4, 2010

Related U.S. Application Data

(63) Continuation-in-part of application No. 12/035,416, filed on Feb. 21, 2008, now abandoned, which is a continuation of application No. 10/772,767, filed on Feb. 4, 2004, now Pat. No. 7,352,394, which is a continuation-in-part of application No. 10/635,862, filed on Aug. 5, 2003, now Pat. No. 7,630,006.

(60) Provisional application No. 61/094,034, filed on Sep. 3, 2008, provisional application No. 61/182,625, filed on May 29, 2009, provisional application No. 61/221,455, filed on Jun. 29, 2009.

(51) Int. Cl.
*H04N 9/73* (2006.01)

(52) U.S. Cl.
USPC ............................. 348/224.1; 382/167

(58) Field of Classification Search
USPC ................. 348/224.1; 382/103, 167
See application file for complete search history.

(56) References Cited

U.S. PATENT DOCUMENTS 4,285,588 A   8/1981 Mir
4,577,219 A   3/1986 Klie et al.
(Continued)

FOREIGN PATENT DOCUMENTS

EP   884694 A1   12/1998
EP   911759 A3   4/1999
(Continued)

OTHER PUBLICATIONS

Agrawal A. et al., "Removing photography artifacts using gradient projection and flash-exposure sampling" ACM Transactions on Graphics, 2005, pp. 828-835.

(Continued)

*Primary Examiner* — Tuan Ho
*Assistant Examiner* — Fayez Bhuiyan
(74) *Attorney, Agent, or Firm* — Andrew V. Smith

(57) ABSTRACT

An image acquisition device includes a flash and optical system for capturing digital images. A face tracker identifies face regions within a series of one or more relatively low resolution reference images, and predicts face regions within a main digital image. A face analyzer determines one or more partial face regions within the one or more face regions each including at least one eye. A red-eye filter modifies an area within the main digital image indicative of a red-eye phenomenon based on an analysis of one or more partial face regions within the one or more face regions identified and predicted by the face tracker.

29 Claims, 21 Drawing Sheets

(56) References Cited

U.S. PATENT DOCUMENTS

| | | |
|---|---|---|
| 4,646,134 A | 2/1987 | Komatsu et al. |
| 4,777,620 A | 10/1988 | Shimoni et al. |
| 4,881,067 A | 11/1989 | Watanabe et al. |
| 4,978,989 A | 12/1990 | Nakano et al. |
| 5,016,107 A | 5/1991 | Sasson et al. |
| 5,070,355 A | 12/1991 | Inoue et al. |
| 5,130,789 A | 7/1992 | Dobbs et al. |
| 5,164,831 A | 11/1992 | Kuchta et al. |
| 5,164,833 A | 11/1992 | Aoki |
| 5,202,720 A | 4/1993 | Fujino et al. |
| 5,227,837 A | 7/1993 | Terashita |
| 5,231,674 A | 7/1993 | Cleveland et al. |
| 5,249,053 A | 9/1993 | Jain |
| 5,274,457 A | 12/1993 | Kobayashi et al. |
| 5,301,026 A | 4/1994 | Lee |
| 5,303,049 A | 4/1994 | Ejima et al. |
| 5,335,072 A | 8/1994 | Tanaka et al. |
| 5,384,601 A | 1/1995 | Yamashita et al. |
| 5,400,113 A | 3/1995 | Sosa et al. |
| 5,424,794 A | 6/1995 | McKay |
| 5,432,863 A | 7/1995 | Benati et al. |
| 5,432,866 A | 7/1995 | Sakamoto |
| 5,452,048 A | 9/1995 | Edgar |
| 5,455,606 A | 10/1995 | Keeling et al. |
| 5,537,516 A | 7/1996 | Sherman et al. |
| 5,568,187 A | 10/1996 | Okino |
| 5,568,194 A | 10/1996 | Abe |
| 5,649,238 A | 7/1997 | Wakabayashi et al. |
| 5,671,013 A | 9/1997 | Nakao |
| 5,678,073 A | 10/1997 | Stephenson, III et al. |
| 5,694,926 A | 12/1997 | DeVries et al. |
| 5,708,866 A | 1/1998 | Leonard |
| 5,719,639 A | 2/1998 | Imamura |
| 5,719,951 A | 2/1998 | Shackleton et al. |
| 5,721,983 A | 2/1998 | Furutsu |
| 5,724,456 A | 3/1998 | Boyack et al. |
| 5,734,425 A | 3/1998 | Takizawa et al. |
| 5,748,764 A | 5/1998 | Benati et al. |
| 5,748,784 A | 5/1998 | Sugiyama |
| 5,751,836 A | 5/1998 | Wildes et al. |
| 5,761,550 A | 6/1998 | Kancigor |
| 5,781,650 A | 7/1998 | Lobo et al. |
| 5,805,720 A | 9/1998 | Suenaga et al. |
| 5,805,727 A | 9/1998 | Nakano |
| 5,805,745 A | 9/1998 | Graf |
| 5,815,749 A | 9/1998 | Tsukahara et al. |
| 5,818,975 A | 10/1998 | Goodwin et al. |
| 5,847,714 A | 12/1998 | Naqvi et al. |
| 5,850,470 A | 12/1998 | Kung et al. |
| 5,862,217 A | 1/1999 | Steinberg et al. |
| 5,862,218 A | 1/1999 | Steinberg |
| 5,892,837 A | 4/1999 | Luo et al. |
| 5,949,904 A | 9/1999 | Delp |
| 5,974,189 A | 10/1999 | Nicponski |
| 5,990,973 A | 11/1999 | Sakamoto |
| 5,991,456 A | 11/1999 | Rahman et al. |
| 5,991,549 A | 11/1999 | Tsuchida |
| 5,991,594 A | 11/1999 | Froeber et al. |
| 5,999,160 A | 12/1999 | Kitamura et al. |
| 6,006,039 A | 12/1999 | Steinberg et al. |
| 6,009,209 A | 12/1999 | Acker et al. |
| 6,011,547 A | 1/2000 | Shiota et al. |
| 6,016,354 A | 1/2000 | Lin et al. |
| 6,028,611 A | 2/2000 | Anderson et al. |
| 6,035,072 A | 3/2000 | Read |
| 6,035,074 A | 3/2000 | Fujimoto et al. |
| 6,036,072 A | 3/2000 | Lee |
| 6,101,271 A | 8/2000 | Yamashita et al. |
| 6,104,839 A | 8/2000 | Cok et al. |
| 6,118,485 A | 9/2000 | Hinoue et al. |
| 6,134,339 A | 10/2000 | Luo |
| 6,151,403 A | 11/2000 | Luo |
| 6,172,706 B1 | 1/2001 | Tatsumi |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,204,868 B1 | 3/2001 | Yamauchi et al. |
| 6,233,364 B1 | 5/2001 | Krainiouk et al. |
| 6,249,315 B1 | 6/2001 | Holm |
| 6,252,976 B1 | 6/2001 | Schildkraut et al. |
| 6,266,054 B1 | 7/2001 | Lawton et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,285,410 B1 | 9/2001 | Marni |
| 6,292,574 B1 | 9/2001 | Schildkraut et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,335,990 B1 | 1/2002 | Chen et al. |
| 6,381,345 B1 | 4/2002 | Swain |
| 6,393,148 B1 | 5/2002 | Bhaskar |
| 6,396,963 B2 | 5/2002 | Shaffer et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,429,924 B1 | 8/2002 | Milch |
| 6,433,818 B1 | 8/2002 | Steinberg et al. |
| 6,438,264 B1 | 8/2002 | Gallagher et al. |
| 6,441,854 B2 | 8/2002 | Fellegara et al. |
| 6,459,436 B1 | 10/2002 | Kumada et al. |
| 6,473,199 B1 | 10/2002 | Gilman et al. |
| 6,496,655 B1 | 12/2002 | Malloy |
| 6,501,911 B1 | 12/2002 | Malloy |
| 6,505,003 B1 | 1/2003 | Malloy |
| 6,510,520 B1 | 1/2003 | Steinberg |
| 6,516,154 B1 | 2/2003 | Parulski et al. |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,700,614 B1 | 3/2004 | Hata |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,765,686 B2 | 7/2004 | Maruoka |
| 6,786,655 B2 | 9/2004 | Cook et al. |
| 6,792,161 B1 | 9/2004 | Imaizumi et al. |
| 6,798,913 B2 | 9/2004 | Toriyama |
| 6,816,619 B2 | 11/2004 | Tlaskal et al. |
| 6,859,565 B2 | 2/2005 | Baron |
| 6,873,743 B2 | 3/2005 | Steinberg |
| 6,885,766 B2 | 4/2005 | Held et al. |
| 6,895,112 B2 * | 5/2005 | Chen et al. .................. 382/167 |
| 6,900,882 B2 | 5/2005 | Iida |
| 6,912,298 B1 | 6/2005 | Wilensky |
| 6,937,997 B1 | 8/2005 | Parulski |
| 6,967,680 B1 | 11/2005 | Kagle et al. |
| 6,980,691 B2 | 12/2005 | Nesterov et al. |
| 6,984,039 B2 | 1/2006 | Agostinelli |
| 6,987,535 B1 | 1/2006 | Matsugu et al. |
| 7,024,051 B2 | 4/2006 | Miller et al. |
| 7,027,662 B2 | 4/2006 | Baron |
| 7,030,927 B2 | 4/2006 | Sasaki |
| 7,035,461 B2 | 4/2006 | Luo et al. |
| 7,035,462 B2 | 4/2006 | White et al. |
| 7,042,501 B1 | 5/2006 | Matama |
| 7,042,505 B1 | 5/2006 | DeLuca |
| 7,062,086 B2 | 6/2006 | Chen et al. |
| 7,099,510 B2 | 8/2006 | Jones et al. |
| 7,116,820 B2 | 10/2006 | Luo et al. |
| 7,130,453 B2 * | 10/2006 | Kondo et al. ................ 382/117 |
| 7,133,070 B2 | 11/2006 | Wheeler et al. |
| 7,155,058 B2 | 12/2006 | Gaubatz et al. |
| 7,171,044 B2 | 1/2007 | Chen et al. |
| 7,216,289 B2 | 5/2007 | Kagle et al. |
| 7,224,850 B2 | 5/2007 | Zhang et al. |
| 7,269,292 B2 | 9/2007 | Steinberg |
| 7,289,664 B2 | 10/2007 | Enomoto |
| 7,295,233 B2 | 11/2007 | Steinberg et al. |
| 7,310,443 B1 | 12/2007 | Kris et al. |

| | | |
|---|---|---|
| 7,315,631 B1 | 1/2008 | Corcoran et al. |
| 7,336,821 B2 | 2/2008 | Ciuc et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,403,654 B2 * | 7/2008 | Wu et al. .................. 382/167 |
| 7,436,998 B2 | 10/2008 | Steinberg et al. |
| 7,454,040 B2 | 11/2008 | Luo et al. |
| 7,474,341 B2 | 1/2009 | DeLuca et al. |
| 7,515,740 B2 | 4/2009 | Corcoran et al. |
| 7,567,707 B2 * | 7/2009 | Willamowski et al. ....... 382/167 |
| 7,903,870 B1 * | 3/2011 | Budagavi .................. 382/162 |
| 2001/0015760 A1 | 8/2001 | Fellegara et al. |
| 2001/0031142 A1 | 10/2001 | Whiteside |
| 2001/0052937 A1 | 12/2001 | Suzuki |
| 2002/0019859 A1 | 2/2002 | Watanabe |
| 2002/0034337 A1 | 3/2002 | Shekter et al. |
| 2002/0041329 A1 | 4/2002 | Steinberg |
| 2002/0051571 A1 | 5/2002 | Jackway et al. |
| 2002/0054224 A1 | 5/2002 | Wasula et al. |
| 2002/0085088 A1 | 7/2002 | Eubanks |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0105662 A1 | 8/2002 | Patton et al. |
| 2002/0114513 A1 | 8/2002 | Hirao |
| 2002/0126893 A1 | 9/2002 | Held et al. |
| 2002/0131770 A1 | 9/2002 | Meier et al. |
| 2002/0136450 A1 | 9/2002 | Chen et al. |
| 2002/0141661 A1 | 10/2002 | Steinberg |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0021478 A1 | 1/2003 | Yoshida |
| 2003/0025808 A1 | 2/2003 | Parulski et al. |
| 2003/0025811 A1 | 2/2003 | Keelan et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0071908 A1 * | 4/2003 | Sannoh et al. ............... 348/345 |
| 2003/0095197 A1 | 5/2003 | Wheeler et al. |
| 2003/0107649 A1 | 6/2003 | Flickner et al. |
| 2003/0113035 A1 | 6/2003 | Cahill et al. |
| 2003/0118216 A1 | 6/2003 | Goldberg |
| 2003/0137597 A1 | 7/2003 | Sakamoto et al. |
| 2003/0142285 A1 | 7/2003 | Enomoto |
| 2003/0161506 A1 | 8/2003 | Velazquez et al. |
| 2003/0190072 A1 | 10/2003 | Adkins et al. |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0042659 A1 | 3/2004 | Guo et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0046730 A1 | 3/2005 | Li |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1 | 10/2005 | Yoshida |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0066628 A1 | 3/2006 | Brodie et al. |
| 2006/0072815 A1 * | 4/2006 | Wu et al. .................. 382/167 |
| 2006/0082847 A1 | 4/2006 | Sugimoto |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0119832 A1 | 6/2006 | Iida |
| 2006/0120599 A1 | 6/2006 | Steinberg et al. |
| 2006/0140455 A1 | 6/2006 | Costache et al. |

| | | | |
|---|---|---|---|
| 2006/0150089 A1 | 7/2006 | Jensen et al. | |
| 2006/0203108 A1 | 9/2006 | Steinberg et al. | |
| 2006/0204052 A1 | 9/2006 | Yokouchi | |
| 2006/0204110 A1 | 9/2006 | Steinberg et al. | |
| 2006/0221408 A1 | 10/2006 | Fukuda | |
| 2006/0285754 A1 | 12/2006 | Steinberg et al. | |
| 2007/0031028 A1 | 2/2007 | Vetter et al. | |
| 2007/0110305 A1 | 5/2007 | Corcoran et al. | |
| 2007/0116379 A1 | 5/2007 | Corcoran et al. | |
| 2007/0116380 A1 | 5/2007 | Ciuc et al. | |
| 2007/0133863 A1 | 6/2007 | Sakai et al. | |
| 2007/0154189 A1 | 7/2007 | Harradine et al. | |
| 2007/0189609 A1 | 8/2007 | Ito et al. | |
| 2007/0196019 A1 | 8/2007 | Yamaguchi | |
| 2007/0201724 A1 | 8/2007 | Steinberg et al. | |
| 2007/0263104 A1 | 11/2007 | DeLuca et al. | |
| 2007/0263928 A1 | 11/2007 | Akahori | |
| 2008/0002060 A1 | 1/2008 | DeLuca et al. | |
| 2008/0013798 A1 | 1/2008 | Ionita et al. | |
| 2008/0043121 A1 | 2/2008 | Prilutsky et al. | |
| 2008/0112599 A1 | 5/2008 | Nanu et al. | |
| 2008/0144965 A1 | 6/2008 | Steinberg et al. | |
| 2008/0186389 A1 | 8/2008 | DeLuca et al. | |
| 2008/0205712 A1 | 8/2008 | Ionita et al. | |
| 2008/0211937 A1 | 9/2008 | Steinberg et al. | |
| 2008/0232711 A1 | 9/2008 | Prilutsky et al. | |
| 2008/0240555 A1 | 10/2008 | Nanu et al. | |
| 2009/0003661 A1 | 1/2009 | Ionita et al. | |
| 2010/0053362 A1 | 3/2010 | Nanu et al. | |
| 2010/0053367 A1 | 3/2010 | Nanu et al. | |
| 2011/0102643 A1 | 5/2011 | Nanu et al. | |

FOREIGN PATENT DOCUMENTS

| | | |
|---|---|---|
| EP | 911759 A3 | 6/2000 |
| EP | 1199672 A2 | 4/2002 |
| EP | 1229486 A1 | 8/2002 |
| EP | 1288858 A1 | 3/2003 |
| EP | 1288859 A1 | 3/2003 |
| EP | 1288860 A1 | 3/2003 |
| EP | 1293933 A1 | 3/2003 |
| EP | 1296510 A2 | 3/2003 |
| EP | 1429290 A2 | 6/2004 |
| EP | 1478169 A2 | 11/2004 |
| EP | 1528509 A2 | 5/2005 |
| EP | 979487 B1 | 3/2006 |
| EP | 1429290 B1 | 7/2008 |
| GB | 841609 A | 7/1960 |
| GB | 2379819 A | 3/2003 |
| JP | 4192681 A2 | 7/1992 |
| JP | 5224271 A2 | 9/1993 |
| JP | 9214839 A2 | 8/1997 |
| JP | 2000-134486 A2 | 5/2000 |
| JP | 2002-247596 A2 | 8/2002 |
| JP | 2002-271808 A2 | 9/2002 |
| JP | 2003-030647 A2 | 1/2003 |
| WO | WO 9802844 A1 | 1/1998 |
| WO | WO-9917254 A1 | 4/1999 |
| WO | WO-9933684 A2 | 7/1999 |
| WO | WO-0171421 A1 | 9/2001 |
| WO | WO-0192614 A1 | 12/2001 |
| WO | WO-0245003 A1 | 6/2002 |
| WO | WO-03026278 A1 | 3/2003 |
| WO | WO-03071484 A1 | 8/2003 |
| WO | WO-2004034696 A1 | 4/2004 |
| WO | WO-2005015896 A1 | 2/2005 |
| WO | WO-2005041558 A1 | 5/2005 |
| WO | 2005/076217 A2 | 8/2005 |
| WO | WO-2005076217 A2 | 8/2005 |
| WO | WO-2005076217 A3 | 8/2005 |
| WO | WO-2005087994 A1 | 9/2005 |
| WO | WO-2005109853 A1 | 11/2005 |
| WO | WO-2006011635 A1 | 2/2006 |
| WO | WO-2006018056 A1 | 2/2006 |
| WO | 2005/076217 A3 | 4/2006 |
| WO | WO-2006045441 A1 | 5/2006 |
| WO | WO-2007057063 A1 | 5/2007 |
| WO | WO-2007057064 A1 | 5/2007 |
| WO | WO-2007093199 A2 | 8/2007 |
| WO | WO-2007093199 A3 | 8/2007 |
| WO | WO-2007095553 A2 | 8/2007 |
| WO | WO-2007095553 A3 | 8/2007 |
| WO | WO-2007142621 A1 | 12/2007 |
| WO | WO-2008023280 A2 | 2/2008 |
| WO | WO-2008109644 A2 | 9/2008 |
| WO | WO-2008109644 A3 | 9/2008 |
| WO | 2010/025908 A1 | 3/2010 |

OTHER PUBLICATIONS

Combier, Nathalie et al., Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering. Proceedings of SPIE—The International Society for Optical Engineering, Society of Photo-Optical Instrumentation, 1995, pp. 301-312.

Co-pending Appl. No. PCT/EP2009/005809.

Co-pending Appl. No. PCT/EP2009/006361.

Corcoran, P. et al., "Automated In-Camera Detection of Flash-Eye Defects", IEEE Transactions on Consumer Electronics, 2005, pp. 11-17, vol. 51—Issue 1.

Cucchiara, R. et al., "Detection of Luminosity Profiles of Elongated Shapes", International Conference on Image Processing, 1996, pp. 635-638, vol. 3.

EPO Communication pursuant to Article 94(3) EPC, for European Patent Application No. 05 792 584,4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Final Office Action mailed Nov. 20, 2009, for U.S. Appl. No. 12/192,897, filed Aug. 15, 2008.

Final Office Action mailed Sep. 1, 2009, for U.S. Appl. No. 11/841,855 filed Aug. 20, 2007.

Gaubatz, Matthew et al., "Automatic Red-Eye Detection and Correction", IEEE ICIP,Proceedings 2002 International Conference on Image Processing, 2002, pp. 1-804-1-807, vol. 2—Issue 3.

Han, T. et al., "Detection and Correction of abnormal Pixels in Hyperion Images", IEEE International Symposium on Geoscience and Remote Sensing, 2002, pp. 1327-1330, vol. 3.

Iivarinen, J. et al., "Content-Based Retrieval of Defect Images, http://www.cs.tut.fi/.about.avisa/digger/Publications/acivs02.pdf", Proceedings of Advanced Concepts for IntelligentVision, Laboratory of Computer Information Science, 2002,.

Ioffe, S., "Red eye detection with machine learning", Proceedings 2003 International Conference on image Processing, 2003, pp. 871-874, vol. 2—Issue 3.

Ito, M., "An Automated System for LSI Fine Pattern Inspection Based on Comparison of Sem Images and Cad Data", IEEE International Conference on Robotics and Automation, 1995, pp. 544-549, vol. 1.

Jin, B. et al., "Modeling and Analysis of Soft-Test/Repair for CCD-Based Digital X-Ray Systems", Instrumentation and Measurement, IEEE Transactions, 2003, pp. 1713-1721, vol. 52—Issue 6.

Nguyen, Karlene et al,, "Differences in the Infrared Bright Pupil Response of Human Eyes", Proceedings of the 2002 symposium on Eye tracking research & applications, 2002, pp. 133-138.

Non-Final Office Action mailed Aug. 31, 2009, for U.S. Appl. No. 11/462,035, filed Aug. 2, 2006.

Non-Final Office Action mailed Jul. 14, 2009, for U.S. Appl. No. 12/192,897, filed Aug. 15, 2008.

Non-Final Office Action mailed Oct. 5, 2009, for U.S. Appl. No. 10/919,226, filed Aug. 16, 2004.

Non-Final Office Action mailed Oct. 7, 2009, for U.S. Appl. No. 12/119,614, filed May 13, 2008.

Non-Final Office Action mailed Oct. 29, 2009, for U.S. Appl. No. 12/194,148, filed Aug. 19, 2008.

Notice of Allowance mailed Feb. 1, 2010, for U.S. Appl. No. 10/919,226, filed Aug. 16, 2004.

Notice of Allowance mailed Nov. 18, 2009, for U.S. Appl. No. 11/282,954, filed Nov. 18, 2005.

Patent Abstracts of Japan, publication No. 2000050062, Image Input Device, application No. 10-217124, published Feb. 18, 2000, 1 page.
PCT International Preliminary Report on Patentability (IPRP) for PCT Application PCT/EP2005/011010, dated Jan. 23, 2007, 18 pages.
PCT International Preliminary Report on Patentability for PCT Application No. PCT/EP2005/005907, dated Nov. 15, 2006, 8 pages.
PCT International Preliminary Report on Patentability for PCT Application PCT/EP2004/008706, dated Feb. 6, 2006, 7 pages.
PCT International Preliminary Report on Patentability for PCT Application PCT/EP2004/010199, dated Apr. 3, 2006, 7 pages.
PCT International Search Report and Written Opinion of the International Searching Authority for PCT Application No. PCT/EP2004/008706, dated Nov. 19, 2004, 13 pages.
PCT International Search Report and Written Opinion of the International Searching Authority for PCT Application No. PCT/EP2005/005033, dated Aug. 4, 2005, 13 pages.
PCT Notification Concerning Transmittal of International Preliminary Report on Patentability, for PCT Application No. PCT/US2007/062090, dated Aug. 28, 2008, 6 pages.
PCT Notification of Transmittal of the International Search Report and the Written Opinion of the International Searching Authority, or the Declaration (PCT/EP2006/008342), dated Dec. 28, 2006.
PCT Notification of Transmittal of the International Search Report and the Written Opinion of the International Searching Authority, or the Declaration for PCT Application No. PCT/US07/62090 issued Mar. 10, 2008, 10 pages.
PCT Notification of Transmittal of the International Search Report and the Written Opinion of the International Searching Authority, or the Declaration for PCT/EP/2005/011010, dated Jan. 23, 2006, 14 pages.
PCT Notification of Transmittal of the International Search Report and the Written Opinion of the International Searching Authority, or the Declaration for PCT/EP/2005105907, dated Aug. 1, 2005, 12 pages.
PCT Notification of Transmittal of the International Search Report and the Written Opinion of the International Searching Authority, or the Declaration, for PCT Application No. PCT/EP2006/008358, Dec. 5, 2006, 14 pages.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 24, 2009, 10 pages.
PCT Notification of Transmittal of the International Search Report and the Written Opinion of the International Searching Authority, or the Declaration, for PCT Application No. PCT/US2008/055964, paper dated Jul. 30, 2008, 8 Pages.
PCT Notification of Transmittal of the International Search Report and the Written Opinion of the International Searching Authority, or the Declaration, for PCT/EP2004/010199, paper dated Dec. 13. 2004, 13 pages.
PCT Notification of Transmittal of the International Search Report and Written Opinion of the International Searching Authority for PCT Application No. PCT/EP2005/001171, dated Jan. 27, 2006, 11 pages.
PCT Partial International Search Report for Application No. PCT/EP2009/051081, dated Apr. 29, 2009, 7 pages.
Plotnikov, Yuri et al., "Advanced Image Processing for Defect Visualization in Infrared Thermography, http://citeseer.ist.psu.edu/plotnikov98advanced.html", NASA Langley Research Center, M.S. Posted: ACM Portal, 1998.
Plotnikov, Yuri et al., Winfree, "Visualization of Subsurface Defects in Composites Using a Focal Plane Array Infrared Camera , http://citeseer.ist.psu.edu/357066.html", NASA Langley Research Center, 1999.
Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.
Shen, Jianhong, "Inpainting and the Fundamental Problem of Image Processing", 2002, 6 pages.
Smolka, B. et al., "Towards Automatic Redeye Effect Removal, XP004416063", Pattern Recognition Letters, 2003, pp. 1767-1785, vol. 24—Issue 11, North-Holland Publ.
Soriano, M. et al., "Making Saturated Facial Images Useful Again, XP002325961, ISSN: 0277-786X", Proceedings of the SPIE, 1999, pp. 113-121, vol. 3826.
Tan, Yap-peng et al., "Robust Sequential Approach for the Detection of Defective Pixels in an Image Sensor, http://ieeexplorejeee.org/search/freesrchabstract.jsp?arnumber=758382&isnumber=16342&punumber=6110&k2dockey=758382©ieeecnfs&query=%28%289%28%28images+and+defects+and+correction%29%29%29+%3Clin%3E", IEEE International Conference on Acoustics, Speech, and Signal Processing, 1999, pp. 2239-2242, vol. 4.
Toet, A., "Multiscale Color Image Enhancement, Posted online: 200208-06 18:09:24.0 http://ieeexplore.ieee.org/search/freesrchabstract.jsp?arnumber=146865&isnumber=3917&punumber=1197&k2dockey=146865©ieeecnfs&query=%28%28images+and+defects+and+luminance%29%29+%3Cin%3E+metadata&pos=1", International Conference on Image Processing and its Applications, 1992, pp. 583-585.
Translation of Hiroshi et al. JP05-224271, Mar. 1993, Japan Publication.
Translation of JP404192681A, Tatsutoshi Kitajima, Electronic Camera, Jul. 10, 1992.
U.S. Appl. No. 10/772,767, filed Feb. 4, 2004, by inventors Michael J. DeLuca, et al.
U.S. Appl. No. 10/170,511, flied Jun. 12, 2002, inventor Michael J. DeLuca.
U.S. Appl. No. 11/217,788, filed Aug. 30, 2005, inventors Eran Steinberg, et al.
United Kingdom Search Report dated May 22, 2007, issued in Application No. GB 0701957.3.
Willamowski, J. et al., "Probabilistic Automatic Red Eye Detection and Correction", The 18th International Conference on Pattern Recognition (ICPR'06), 2006, pp. 762-765, vol. 3, IEEE Computer Society.
Notification of Transmittal of the International Search Report and the Written Opinion of the International Searching Authority, or the Declaration, for PCT Application No. PCT/EP2009/006361, dated Nov. 11, 2009, 10 pages.
Gaubatz M, et al., Automatic red-eye detection and correction, Proceedings / 2002 International Conference on Image Processing: Sep. 22-25, 2002, Rochester, New York, USA, IEEE Operations Center, Piscataway, NJ, vol. 1, Sep. 22, 2002, pp. 804-807, XP010607446 ISBN: 978-0-7803-7622-9.
PCT Notification Concerning Transmittal of International Preliminary Report on Patentability (Chapter I of the Patent Cooperation Treaty), for PCT Application No. PCT/EP2009/006361, report dated Mar. 8, 2011, 6 pages.
Non-final Rejection, dated Jan. 26, 2012, for U.S. Appl. No. 12/551,282, filed Aug. 31, 2009.
Final Rejection, dated Oct. 27, 2011, for U.S. Appl. No. 12/551,312, filed Aug. 31, 2009.
Non-Final Rejection, dated Jan. 29, 2013, for U.S. Appl. No. 13/351,177, filed Jan. 16, 2012.
Non-Final Rejection, dated Apr. 3, 2013, for U.S. Appl. No. 12/551,312, filed Aug. 31, 2009.
Non-Final Rejection, dated Dec. 24, 2012, for U.S. Appl. No. 12/941,995, Nov. 8, 2010.
Final Rejection, dated Dec. 12, 2012, for U.S. Appl. No. 12/038,777, filed Feb. 27, 2008.
Notice of Allowance, dated Nov. 13, 2012, for U.S. Appl. No. 12/437,464, filed May 7, 2009.
Notice of Allowance, dated Nov. 5, 2012, for U.S. Appl. No. 12/790,594, filed May 28, 2010.
Non-Final Rejection, dated Jan. 10, 2013, for U.S. Appl. No. 12/825,280, filed Jun. 28, 2010.

* cited by examiner

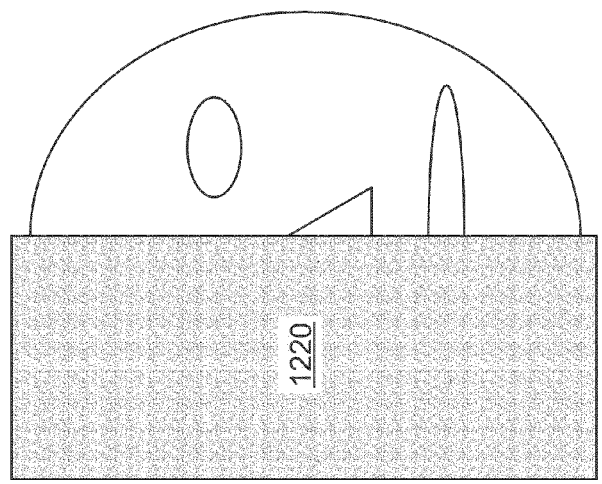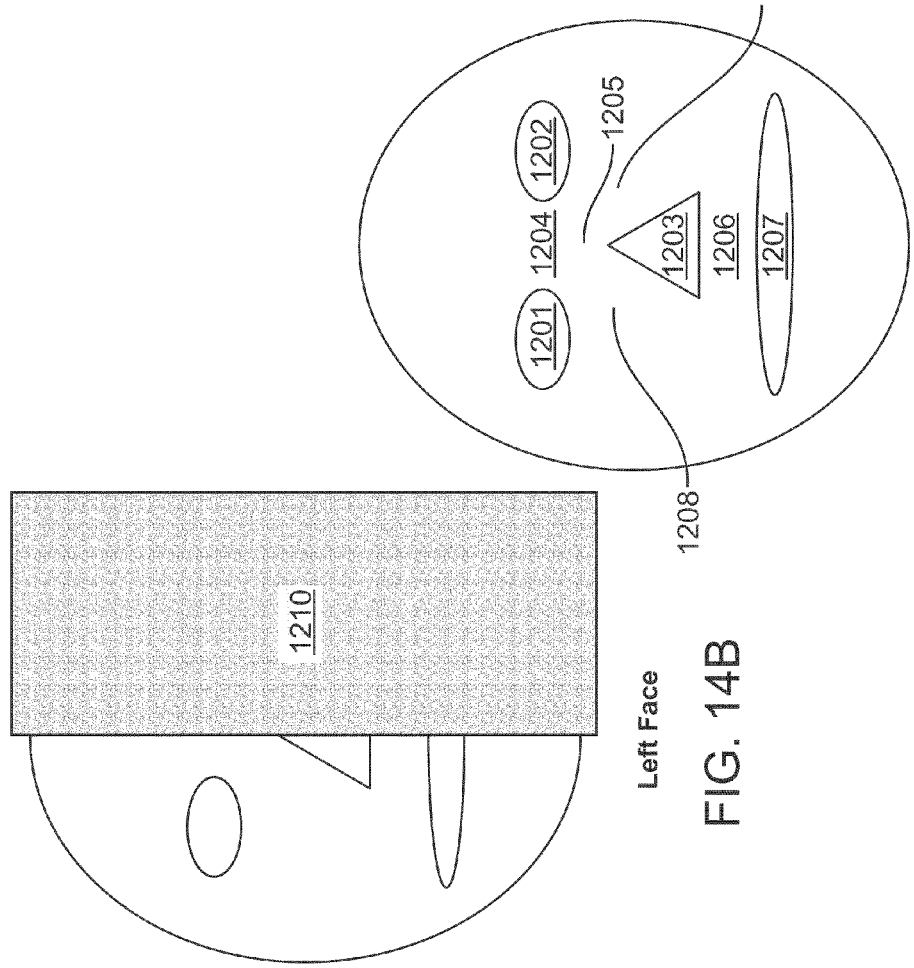

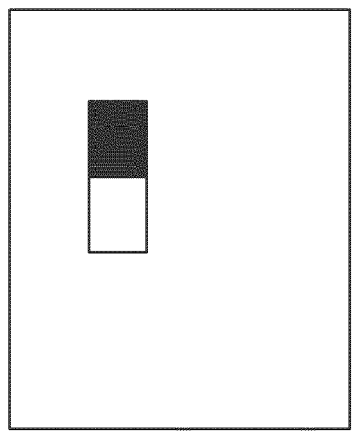
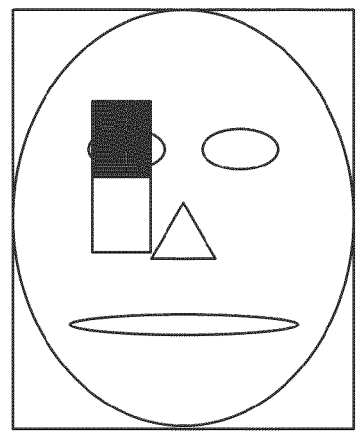
FIG. 16A      FIG. 16B
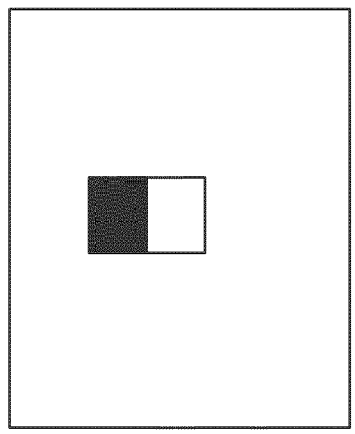
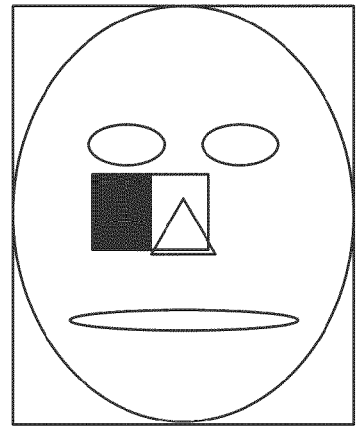
FIG. 16C      FIG. 16D
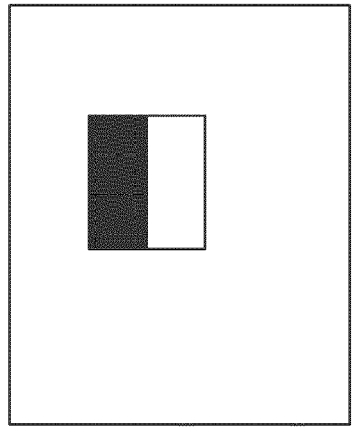
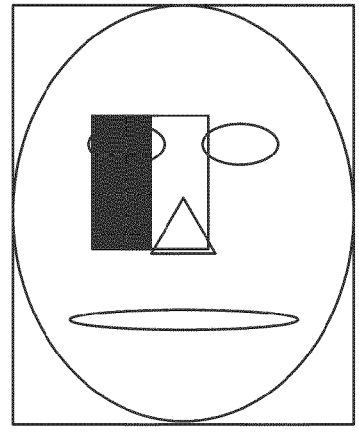
FIG. 16E      FIG. 16F

FACE TRACKER AND PARTIAL FACE TRACKER FOR RED-EYE FILTER METHOD AND APPARATUS

RELATED APPLICATIONS

This application claims the benefit of priority to U.S. provisional patent application Nos. 61/094,034, filed Sep. 3, 2008 and 61/182,625, filed May 29, 2009 and 61/221,455, filed Jun. 29, 2009. This application is also a continuation-in-part (CIP) of U.S. patent application Ser. No. 12/035,416, filed Feb. 21, 2008 now abandoned, which is a continuation of U.S. Ser. No. 10/772,767, filed Feb. 4, 2004, now U.S. Pat. No. 7,352,394, which is a CIP of U.S. Ser. No. 10/635,862, filed Aug. 5, 2003, now U.S. Pat. No. 7,630,006. This application is also related to U.S. patent application Ser. Nos. 10/635,918, 11/690,834, 11/769,206, 12/119,614, 10/919,226, 11/379,346, 61/182,065, 61/221,455 and 61/094,036, and U.S. Pat. Nos. 6,407,777, 7,042,505, 7,436,998, 7,536,036 and 7,474,341 and a contemporaneously filed application entitled Method And Apparatus For Red-Eye Detection In An Acquired Digital Image, and two further contemporaneously filed applications also entitled "Optimized Performance and Performance for Red-Eye Filter Method and Apparatus" by the same inventors listed above. All of these patents and patent applications are each hereby incorporated by reference.

FIELD OF THE INVENTION

The invention relates generally to the area of flash photography, and more specifically to filtering "red-eye" from a digital camera image.

BACKGROUND OF THE INVENTION

"Red-eye" is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera and ambient light levels.

The red-eye phenomenon can be minimized by causing the iris to reduce the opening of the pupil. This is typically done with a "pre-flash", a flash or illumination of light shortly before a flash photograph is taken. This causes the iris to close. Unfortunately, the pre-flash is an objectionable 0.2 to 0.6 seconds prior to the flash photograph. This delay is readily discernible and easily within the reaction time of a human subject. Consequently the subject may believe the pre-flash is the actual photograph and be in a less than desirable position at the time of the actual photograph. Alternately, the subject must be informed of the pre-flash, typically loosing any spontaneity of the subject captured in the photograph.

Those familiar with the art have developed complex analysis processes operating within a camera prior to invoking a pre-flash. Various conditions are monitored prior to the photograph before the pre-flash is generated, the conditions include the ambient light level and the distance of the subject from the camera. Such a system is described in U.S. Pat. No. 5,070,355 to Inoue et al. Although that invention minimizes the occurrences where a pre-flash is used, it does not eliminate the need for a pre-flash. What is needed is a method of eliminating the red-eye phenomenon with a miniature camera having an integral without the distraction of a pre-flash.

Digital cameras are becoming more popular and smaller in size. Digital cameras have several advantages over film cameras. Digital cameras eliminate the need for film as the image is digitally captured and stored in a memory array for display on a display screen on the camera itself. This allows photographs to be viewed and enjoyed virtually instantaneously as opposed to waiting for film processing. Furthermore, the digitally captured image may be downloaded to another display device such as a personal computer or color printer for further enhanced viewing. Digital cameras include microprocessors for image processing and compression and camera systems control. Nevertheless, without a pre-flash, both digital and film cameras can capture the red-eye phenomenon as the flash reflects within a subject's eye. Thus, what is needed is a method of eliminating red-eye phenomenon within a miniature digital camera having a flash without the distraction of a pre-flash.

BRIEF DESCRIPTION OF THE DRAWINGS

FIGS. 14a-c show illustrations of a full human face, a face with the right side obstructed, and a face with the left side obstructed.

FIGS. 16a-f show graphical representations of left face classifiers, and graphical representations of those left-face classifiers applied to illustrations of a full human face.

DESCRIPTION OF EMBODIMENTS

Figure 1:
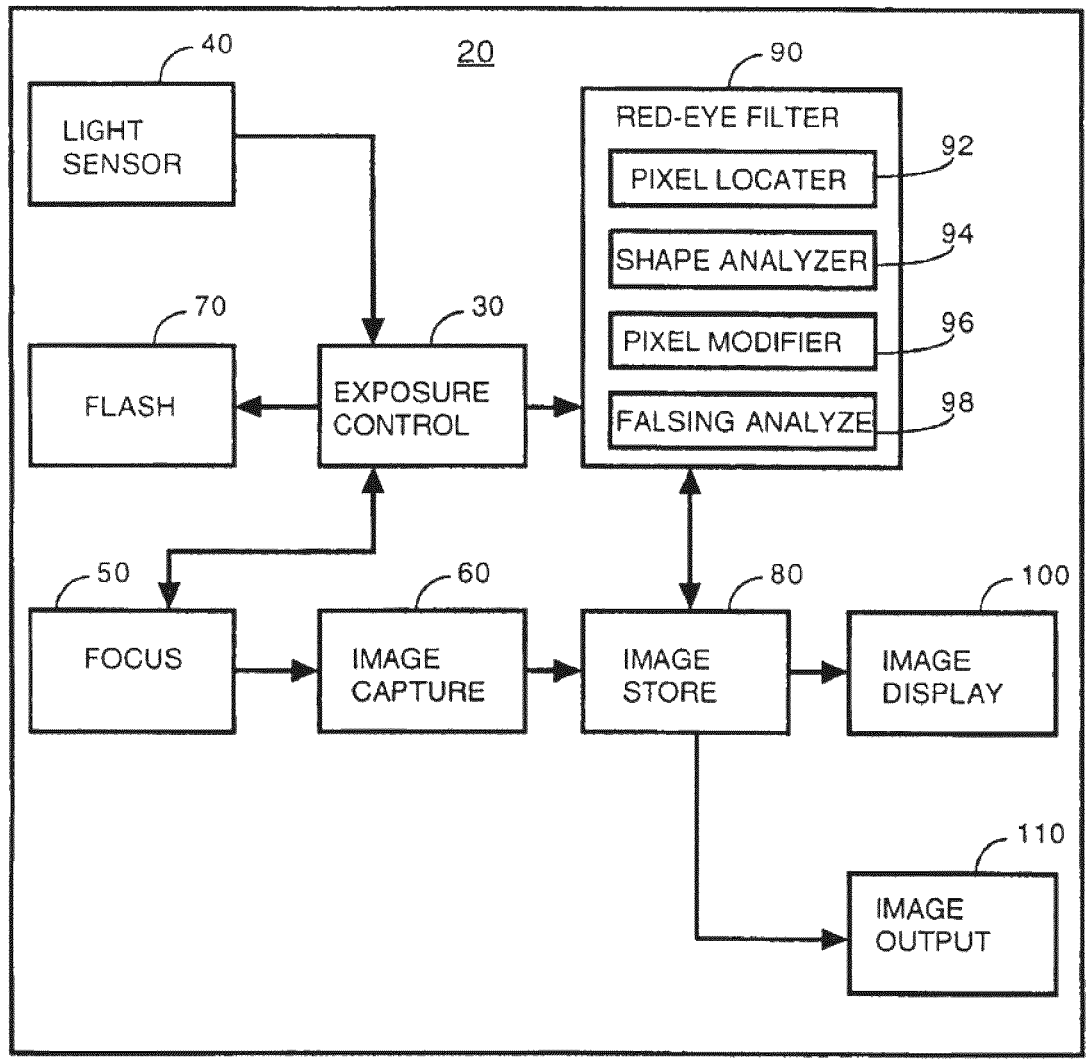
FIG. 1 shows a block diagram of a camera apparatus operating in accordance with certain embodiments.

In accordance with certain embodiments, a portable digital camera having no photographic film includes an integral flash for providing illumination during image acquisition and/or recording, a digital image capturing apparatus for acquiring and/or recording an image, and a red-eye filter. The red eye filter is for modifying an area within the image indicative of a red-eye phenomenon based on an analysis of a subsample representation including a partial face region within the image.

The analysis may be performed at least in part for determining the area, and/or may be performed at least in part for determining the modifying. The partial face region may include the entire image or one or more regions of the entire image may be excluded. The partial face region may include multi resolution encoding. The analysis may be performed in part on a full resolution image and in part on a subsample resolution of the digital image.

The apparatus may include a module for changing a degree of subsampling. This changing the degree of subsampling may be determined empirically, and/or based on a size of the image or one or more partial face regions thereof, and/or based on data obtained from the camera relating to the settings of the camera at the time of image capture. In the latter case, the data obtained from the camera may include an aperture setting, focus of the camera, distance of the subject from the camera, or a combination of these. The changing the degree of the subsampling may also be determined based digitized image metadata information and/or a complexity of calculation for the red eye filter.

The modifying of the area may be performed on a full resolution of the digital image. The red-eye filter may include multiple sub filters. The subsampling for the sub filters may include operating on one or more partial face regions of the image that may be determined by one or more of the image size, suspected as red eye region size, filter computation complexity, empirical success rate of said sub filter, empirical false detection rate of said sub filter, falsing probability of said sub filter, relations between said suspected regions as red eye, results of previous analysis of other said sub filters.

The apparatus may include a memory for saving the digitized image after applying the filter for modifying pixels as a modified image, and/or a memory for saving the subsample representation of the image. The subsample representation of selected regions of the image may be determined in hardware. The analysis may be performed in part on the full resolution image and in part on a subsample resolution of the image.

The subsample representation may be determined using spline interpolation, and may be determined using bi-cubic interpolation.

According to another aspect, a portable digital camera having no photographic film includes an integral flash for providing illumination during image acquisition and/or recording, a digital image capturing apparatus for acquiring and/or recording an image, an image store and a red-eye filter. The image store is for holding a temporary copy of an unprocessed image known as a pre-capture image, a permanent copy of a digitally processed, captured image, and a subsample representation including one or more partial face regions of at least one of the images, e.g., the pre-capture image. The red-eye filter is for modifying an area within at least one of the images indicative of a red-eye phenomenon based on an analysis of the subsample representation including the one or more partial face regions. Preferably, the at least one of the images includes the digitally processed, captured image. This further aspect may also include one or more features in accordance with the first aspect.

In addition, the changing the degree of the subsampling may be determined based on data obtained from the camera relating to image processing analysis of said precapture images. The image processing analysis may be based on histogram data or color correlogram data, or both, obtained from the pre-capture image. The image processing analysis may also be based on global luminance or white balance image data, or both, obtained from the pre-capture image. The image processing analysis may also be based on a face detection analysis of the pre-capture image, or on determining pixel regions with a color characteristic indicative of redeye, or both.

The red eye filter of a camera in accordance with either aspect may include a pixel locator, a shape analyzer and/or a pixel modifier. The pixel locator is for locating pixels having a color indicative of the red-eye phenomenon. The shape analyzer is for determining if a grouping of at least a portion of the pixels located by the pixel locator comprise a shape indicative of the red-eye phenomenon. The pixel modifier is for modifying the color of the pixels within the grouping. The camera may further include a falsing analyzer for further processing the image in a vicinity of the grouping for details indicative of an eye, and for enabling the pixel modifier in response thereto. The camera may also include an exposure analyzer for determining if the image was acquired and/or recorded in a condition indicative of the red-eye phenomenon.

In accordance with certain embodiments, a method of filtering a red eye phenomenon from an acquired and/or recorded image is also provided in accordance with another aspect, wherein the image includes a multiplicity of pixels indicative of color. The method includes determining whether one or more partial face regions within a subsample representation of the acquired and/or recorded image are suspected as including red eye artifact.

The method may include varying a degree of subsampling for each region of the one or more partial face regions, and/or generating a subsample representation including the one or more partial face regions based on analysis of the image. The subsample representation may be generated or the degree varied, or both, utilizing a hardware-implemented subsampling engine. One or more partial face regions within said subsample representation determined as including red eye artifact may be tested for determining any false redeye groupings.

The method may further include associating the one or more partial face regions within the subsample presentation of the image with one or more corresponding regions within the acquired and/or recorded image, and modifying the one or more corresponding regions within the acquired and/or recorded image. The determining may include analyzing meta-data information including image acquisition device-specific information.

The method may include analyzing the subsample representation including partial face regions of the acquired and/or recorded image, and modifying an area determined to include red eye artifact. The analysis may be performed at least in part for determining said area and/or the modifying. The one or more partial face regions may include the entire image or may exclude one or more non-facial regions and/or one or more partial face regions not including any eye or at least not including any red eyes. The partial face regions of the image may include multi resolution encoding of the image. The analyzing may be performed in part on a full resolution image and in part on a subsample resolution image.

The method may include changing the degree of the subsampling. This changing of the degree of subsampling may be determined empirically, and/or based on a size of the image or selected regions thereof, such as the one or more partial face regions.

The method may include saving the image after applying the filter for modifying pixels as a modified image, and/or saving the subsample representation of the image. The method may include determining the subsample representation in hardware, and/or using a spline or bi-cubic interpolation.

The modifying of the area may be performed on a full resolution image or partial image including one or more partial face regions. The method may include determining the subsample representation utilizing a plurality of sub-filters. The determining of the plurality of sub-filters may be based on one or more of the image size, a suspected red eye region size, filter computation complexity, empirical success rate of the sub-filter, empirical false detection rate of the sub-filter, falsing probability of the sub-filter, relations between said suspected red eye regions, or results of previous analysis of one or more other sub-filters.

The method may further include locating pixels, analyzing pixel shapes and/or modifying pixels, each in accordance with identifying and removing a red eye phenomenon from a partial face regions identified within an acquired and/or recorded digital image. That is, the method may include locating pixels having a color indicative of the red-eye phenomenon. The method may further include determining if a grouping of at least a portion of the located pixels comprises a shape indicative of the red-eye phenomenon. The method may further include modifying the color of the pixels within the grouping. The method may further include processing the image in a vicinity of the grouping for details indicative of an eye, and enabling the pixel modifier in response thereto. The method may further include determining if the image was acquired and/or recorded in a condition indicative of the red-eye phenomenon.

FIG. 1 shows a block diagram of a camera apparatus operating in accordance with the present invention. The camera 20 includes an exposure control 30 that, in response to a user input, initiates and controls the digital photographic process. Ambient light is determined using light sensor 40 in order to automatically determine if a flash is to be used. The distance to the subject is determined using focusing means 50 which also focuses the image on image capture means 60. The image capture means digitally records the image in color. The image capture means is known to those familiar with the art and may include a CCD (charge coupled device) to facilitate digital recording. If a flash is to be used, exposure control means 30 causes the flash means 70 to generate a photographic flash in substantial coincidence with the recording of the image by image capture means 60. The flash may be selectively generated either in response to the light sensor 40 or a manual input from the user of the camera. The image recorded by image capture means 60 is stored in image store means 80 which may comprise computer memory such a dynamic random access memory or a nonvolatile memory. The red-eye filter 90 then analyzes the stored image for characteristics of red-eye, and if found, modifies the image and removes the red-eye phenomenon from the photograph as will be describe in more detail. The red-eye filter includes a pixel locator 92 for locating pixels having a color indicative of red-eye; a shape analyzer 94 for determining if a grouping of at least a portion of the pixels located by the pixel locator comprise a shape indicative of red-eye; a pixel modifier 96 for modifying the color of pixels within the grouping; and an falsing analyzer 98 for further processing the image around the grouping for details indicative of an image of an eye. The modified image may be either displayed on image display 100 or downloaded to another display device, such as a personal computer or printer via image output means 110. It can be appreciated that many of the processes implemented in the digital camera may be implemented in or controlled by software operating in a microcomputer (μC) or digital signal processor (DSP) and/or an application specific integrated circuit (ASIC).

In a further embodiment the image capture means 60 of FIG. 1 includes an optional image subsampling means, wherein the image is actively down-sampled. In one embodiment, the subsampling is done using a bi-cubic spline algorithm, such as those that are known to one familiar in the art of signal and image processing. Those familiar with this art are aware of subsampling algorithms that interpolate and preserve pixel relationships as best they can given the limitation that less data is available. In other words, the subsampling stage is performed to maintain significant data while minimizing the image size, thus the amount of pixel-wise calculations involved, which are generally costly operations.

A subsample representation may include a multi resolution presentation of the image, as well as a representation in which the sampling rate is not constant for the entire image. For example, areas suspected as indicative of red eye may have different resolution, most likely higher resolution, than areas positively determined not to include red eye.

In an alternative embodiment, the subsampling component utilizes hardware based subsampling wherein the processing unit of the digital imaging appliance incorporates a dedicated subsampling engine providing the advantage of a very fast execution of a subsampling operation. Such digital imaging appliance with dedicated subsampling engine may be based on a state-of-art digital imaging appliance incorporating hardware that facilitates the rapid generation of image thumbnails.

The decision to subsample the image is, in part, dependent on the size of the original image. If the user has selected a low resolution image format, there may be little gain in performance of redeye detection and false avoidance steps. Thus, the inclusion of a subsampling component, or step or operation, is optional, yet advantageous in many embodiments.

The red eye detection filter of the preferred embodiment may comprise a selection of sub filters that may be calculated in succession or in parallel. In such cases, the sub-filters may operate on only a selected region, or a suspected region. Such regions are substantially smaller than the entire image. The decision to subsample the image is, in part, dependent on one or a combination of a few factors such as the size of the suspected region, the success or failure of previous or parallel filters, the distance between the regions and the complexity of the computation of the sub filter. Many of the parameters involved in deciding whether or not to subsample a region, and to what degree, may also be determined by an empirical process of optimization between success rate, failure rate and computation time.

Where the subsampling means, step or operation is implemented, then both the original and subsampled images are preferably stored in the image store 80 of FIG. 1. The subsampled image is now available to be used by the redeye detector 90 and the false avoidance analyzer 98 of FIG. 1.

As discussed before, the system and method of the preferred embodiment involves the detection and removal of red eye artifacts. The actual removal of the red eye will eventually be performed on the full resolution image. However, all or portions of the detection of redeye candidate pixel groupings, the subsequent testing of said pixel groupings for determining false redeye groupings, and the initial step of the removal, where the image is presented to the user for user confirmation of the correction, can be performed on the entire image, the subsampled image, or a subset of regions of the entire image or the subsampled image.

There is generally a tradeoff between speed and accuracy. Therefore, according to yet another embodiment involving performing all detection on the subsampled image, the detection, and subsequent false-determining, may be performed selectively, e.g., sometimes on full resolution regions that are suspected as red-eye, and sometimes on a subsampled resolution. The search step 200 of FIG. 8 may include, in a practical embodiment, a number of successively applied color filters based on iterative refinements of an initial pixel by pixel search of the captured image. In addition to searching for a red color, it is preferably determined whether the luminance, or brightness of a redeye region, lies within a suitable range of values. Further, the local spatial distribution of color and luminance are relevant factors in the initial search for redeye pixel groupings. As each subsequent filter is preferably only applied locally to pixels in close proximity to a grouping of potential redeye pixels, it can equally well be applied to the corresponding region in the full-sized image.

Thus, where it is advantageous to the accuracy of a particular color-based filter, it is possible to apply that filter to the full-sized image rather than to the subsampled image. This applies equally to filters which may be employed in the false-determining analyzer 98.

Examples of non-color based false-determining analysis filters include those which consider the localized contrast, saturation or texture distributions in the vicinity of a potential redeye pixel grouping, those that perform localized edge or shape detection and more sophisticated filters which statistically combine the results of a number of simple local filters to enhance the accuracy of the resulting false-determining analysis.

It is preferred that more computationally expensive filters that operate on larger portions of the images will utilize a subsampled version, while the more sensitive and delicate filters may be applied to the corresponding region of the full resolution image. It is preferred that in the case of full resolution only small portions of the image will be used for such filters.

As a non exhaustive example, filters that look for a distinction between lips and eyes may utilize a full resolution portion, while filters that distinguish between background colors may use a subsample of the image. Furthermore, several different sizes and or resolutions of subsampled images may be generated and employed selectively to suit the sensitivity of the different pixel locating and false determining filters.

Partial Face Regions

A portable digital image capturing device is provided which has no photographic film. A flash for provides illumination during image acquisition. An optical system includes a lens and an image sensor for capturing a digital image. A partial face detector identifies one or more partial face regions within the digital image. A red-eye filter modifies an area within the image indicative of a red-eye phenomenon based on an analysis of a subsample representation comprising one or more partial face regions identified within the image.

A corresponding method is also provided, as are digital storage media having processor-readable code embedded therein for programming a processor to perform the method. The method includes acquiring a series of one or more relatively low resolution reference images; identifying one or more partial face regions within the one or more relatively low resolution reference images each including at least one eye; predicting the one or more partial face regions within a main digital image based on the identifying; capturing the main digital image with a portable device that includes a lens and an image sensor; providing flash illumination during the capturing of the main digital image with the portable device; analyzing said one or more partial face regions within the digital image, while foregoing within the digital image analysis of at least one other partial face region not including an eye; and modifying an area within the at least one partial face region that is determined to be indicative of a red-eye phenomenon based on said analyzing.

Another portable digital image capturing device is provided which has no photographic film. A flash provides illumination during image acquisition. An optical system includes a lens and an image sensor for capturing a main digital image. A partial face tracker identifies one or more partial face regions within a series of one or more relatively low resolution reference images, and predicts one or more partial face regions within the main digital image. A red-eye filter modifies an area within the main digital image indicative of a red-eye phenomenon based on an analysis of the one or more partial face regions identified and predicted by the partial face tracker.

A corresponding method is also provided, as are digital storage media having processor-readable code embedded therein for programming a processor to perform the method. The method includes acquiring a series of one or more relatively low resolution reference images; identifying one or more partial face regions within the one or more relatively low resolution reference images each including at least one eye; predicting the one or more partial face regions within a main digital image based on the identifying; capturing the main digital image with a portable device that includes a lens and an image sensor; providing flash illumination during the capturing of the main digital image with the portable device; analyzing said one or more partial face regions within the digital image, while foregoing within the digital image analysis of at least one other partial face region not including an eye; and modifying an area within the at least one partial face region that is determined to be indicative of a red-eye phenomenon based on said analyzing.

Another portable digital image capturing device is provided which has no photographic film. A flash for provides illumination during image acquisition. An optical system includes a lens and an image sensor for capturing a digital images. A face tracker identifies one or more face regions within a series of one or more relatively low resolution reference images, and predicts one or more face regions within a main digital image. A face analyzer determines one or more partial face regions within the one or more face regions each including at least one eye. A red-eye filter modifies an area within the main digital image indicative of a red-eye phenomenon based on an analysis of the one or more partial face regions within the one or more face regions identified and predicted by the face tracker.

A corresponding method is also provided, as are digital storage media having processor-readable code embedded therein for programming a processor to perform the method. The method includes acquiring a series of one or more relatively low resolution reference images; identifying one or more face regions within the one or more relatively low resolution reference images each including at least one eye; predicting the one or more face regions within a main digital image based on the identifying; capturing the main digital image with a portable device that includes a lens and an image sensor; providing flash illumination during the capturing of the main digital image with the portable device; determining and analyzing one or more partial face regions, each including at least one eye, within the one or more face regions of the digital image, while foregoing within the digital image analysis of at least one other partial face region not including an eye; and modifying an area within the at least one partial face region that is determined to be indicative of a red-eye phenomenon based on said analyzing.

A red-eye filter may be adapted based on a type of a partial face region identified within the digital image. The analysis may be performed at least in part for determining said area and/or for determining said modifying. In certain embodiments, at least one partial face region within the digital image is not among the one or more partial face regions identified within the digital image that are analyzed. The analysis may be performed in part on a full resolution partial face region and in part on a subsample resolution of at least one different partial face region. A module may be provided change the degree of said subsampling. The subsample representation may be determined using spline or bi-cubic interpolation. The modifying of the area may be performed on a full resolution version of a partial face region within the digital image. The red-eye filter may include multiple sub-filters. Subsampling for the sub-filters operating on selected regions of the image may be determined by image size, a suspected red eye region size, filter computation complexity, empirical success rate of said sub-filter, empirical false detection rate of said sub-filter, falsing probability of said sub-filter, relations between suspected red eye regions, or results of previous analysis of one or more other sub-filters, or combinations thereof.

A device in certain embodiments may include the following:
a pixel locator for locating pixels having a color indicative of the red-eye phenomenon;
a shape analyzer for determining if a grouping of at least a portion of the pixels located by the pixel locator comprise a shape indicative of the red-eye phenomenon; and
a pixel modifier for modifying the color of the pixels within the grouping.

A device is certain embodiments may further include a falsing analyzer for further processing the digital image in a vicinity of the grouping for details indicative of an eye, and for enabling the pixel modifier in response thereto.

The device may further include an exposure analyzer for determining if the digital image was acquired in a condition indicative of the red-eye phenomenon.

In certain embodiments face detection can be performed more quickly on a subsampled image than is possible on a final (full-sized and/or full-resolution) image. It is further advantageous in certain embodiments for the subsampled image to include one or more partial face regions, while excluding: one or more non-face regions, and/or one or more other partial face regions that do not include an eye or at least not any red eyes.

In one particularly advantageous embodiment, a prefilter includes a partial face filter. Now it is well known to determine facial regions and to employ this knowledge to narrow the search region for elements of an image such as red-eye. Often, however, an accurately determined face region will not be directly available and additional image processing will be required to delineate the face region. It can also be resource intensive to search for full faces in digital images. However, where an approximate or partial face region detector is available within an imaging device as part of the device hardware, or as an optimized firmware module, and where certain physical or geometric or spatial characteristics of an approximate or partial face region are known (for whatever reason, including being provided by an automatic or manual full face detector that can be followed by an eye region detector, or a partial face detector or direct eye region detector), it is possible to adapt red-eye filter parameters, or filter chain correspondingly, achieving a faster and/or more accurate analysis of flash eye defects within that approximate or partial face region.

As illustrative examples, a number of generic forms of approximate or partial face regions may be available within a digital image acquisition device. Knowledge of face-patches and/or partial face regions may be advantageously employed to adapt red-eye filter parameters or to add and/or remove filters from, or otherwise adapt a red-eye filter chain.

Among face-based regions are full face regions and partial face regions. Other regions include foreground and portrait regions and combinations of these regions. An advantageous red eye filter can utilize any of a wide variety of example regions among available face-based regions, foreground regions and portrait regions. Face-based regions may be determined using face detection, face tracking and/or face recognition techniques such as those described in any one or more of U.S. Pat. Nos. 7,466,866, 7,515,740, 7,460,695, 7,469,055, 7,403,643, 7,460,694, 7,315,630, 7,315,631, 7,551,754, 7,565,030, 7,551,755, 7,558,408, 7,555,148, 7,564,994, 7,362,368, 7,269,292, 7,471,846, 7,574,016, 7,440,593, and 7,317,815, and U.S. Ser. Nos. 12/026,484, 11/861,854, 12/362,399, and 12/354,707. Foreground regions may be determined using techniques such as those described in U.S. Pat. No. 7,336,821, and US20060285754, US20060093238, and US20070269108, and U.S. Ser. No. 11/573,713. Portrait region determinations may be made in accordance with US2007/0147820.

A full face region may include a region, typically rectangular, which contains a full face with all of the significant facial features at least including two eyes a nose and a mouth, and may require hair, chin, forehead, ears and/or another region or regions. Raw face regions may be extracted from detection processes on a main acquired image. Probably the best known face detection method is that attributed to Viola-Jones (see, e.g., U.S. Pat. Nos. 7,020,337, 7,031,499, 7,099, 510, and 7,197,186). A predicted face region may be a region determined from a face tracker acting on a preview image stream, where a face is very likely to be found in the main acquired image (MAI). A refined face region may include a detected face that is not frontal or where illumination is uneven. There may be erroneous results from a raw detection and it is often beneficial to further refine the location of the face using edge detection, color segmentation (skin) and/or other techniques.

Partial face regions are sub-regions of a face which are often available from image pre-processing within an acquisition device or printer. Examples include half-face, top face, and eye strip. A half-face may include a left or right half face region. A method for extracting such is described in U.S. application Ser. No. 61/084,942. A top face is a region limited to the face above the mouth and also perhaps above the nose, although the cut-off point may be determined or set in individual component processes. A top face region may include the hair region, but this is optional. A specific face classifier cascade can be trained to detect the eye-nose and surrounding face region, while avoiding the lips, chin, beard and other parts of the bottom part of the face. These bottom regions can be problematic and require additional analysis filters to be added to the chain, and so use of top face can be advantageous. An eye strip includes a horizontal strip of the face region which contains the eyes only, among the main facial features.

Foreground image regions may include portions of the image which are closer to the camera. Foreground analysis methods may be combined with a face detector and additional post processing to ensure, for example, that full hair and clothing are retained in a foreground region when desired.

There are a number of variants including raw foreground, portrait-foreground combined, face foreground-portrait combined and refined portrait. Raw foreground implies foreground regions without any face/portrait analysis. Portrait foreground combined uses both foreground/background analysis along with a portrait template. A portrait template may be used in such as way that a user can position a person being photographed within the template to optimize portrait image quality. In this process, face detection may be considered optional. In a face foreground-portrait combined process, face detection is combined with foreground/background analysis to provide a refined portrait region. This can include, for example, a full face and/or a triangular region of the image containing the top-portion of the subject's body. Refined portrait employs a combination of face and portrait template, and foreground/background, and can also include color segmentation (see, e.g., US20080175481) and/or top-head filling (see, e.g., US20070269108). This variant provides a very accurate head-full-hair-full body to be delineated in the image.

A knowledge that an image region is likely to contain a face and that the type of image regions is a member of one of the above categories, or refinements thereof, can be advantageously employed to adapt a red-eye filter chain applied to the image patch.

Note that where the term "red-eye" is used in this description, it is meant to include along with red-eye also generic flash-eye defects such as golden, eye, white eye and zombie eye. Thus elements may be added to the filter chain to enable detection of such non-red defects. Image processing techniques according to certain embodiments for such defects are described in US20070116379, US20080049970, US20090189998, and US20090123063, and US20080122599, and U.S. Pat. No. 7,336,821, which are hereby incorporated by reference.

In an exemplary embodiment an image is acquired within the device (or analyzed within a printer). Certain pre-processing information is available from the device, or metadata is obtained from a pre-processing subsystem such as a real-time face tracker, or foreground/background segmentation unit, or portrait analyzer, which distinguishes specific regions within the MAI. These regions fall into at least one of the categories described above. Based on a determination of the type of each region a modified red-eye algorithm is applied to those sub-regions of the MAI (or a subsampled version thereof).

In order to better explain the operation we will next give some examples of advantageous adaptions of a red-eye analysis chain:

Modifications for Full-Face Regions

Where the region is any of the full-face regions mentioned above, then various face confirmation filters can be dropped from the red-eye algorithm when applied to these regions. However it may still be desirable to retain local skin confirmation filters as items of red-jewelry or red patterns in a headband or scarf may still give false positive results.

In an alternative embodiment, a filter based on the general location within the approximate or partial region can be used to additionally eliminate skin filters. Such a filter checks that detected eye defects lie in the upper half of the region and certain size constraints can be applied. In addition detected defects are expected to be approximately symmetric and additional pairing analysis filters can be employed (see, e.g., US20080112599). The face and skin filters may typically be computationally intensive within a red-eye filter chain, and thus often desirable to eliminate, even where this elimination requires multiple additional filters to be added to the chain.

These techniques can be used more effectively on refined face regions, and less so on predicted face regions, where the filter determines relative as opposed to absolute positions. This is because predicted face regions are often somewhat larger than the face which can be located anywhere within the region due to movement. Similarly, the use of pairing filters can be employed in a relative, rather than in an absolute sense. Some use of skin/face confirmation may be desirable for regions of this category, although it can be less exhaustive than that employed where knowledge of the type of face is not known. Finally, the use of size constraints may be broadly similar, i.e., thresholds may be slightly more flexible to take account of the possibility of forwards/backwards face movement to that employed for refined face regions.

Modifications for Partial Face Regions

For (left/right) half-face regions the face filters and, optionally, local skin filters can be eliminated. A new filter which checks the location of the defect to be central can be added. Also, only one defect per region is expected so the pairing filters can be eliminated. If no candidate is found then (slower) non-red filters can be applied.

For top-face regions all face and skin filters can be eliminated because only the eye/nose region is provided; thus there is no risk of headbands, scarves, ear-rings or necklaces. In addition, all the lips filters can be eliminated. Some of the lips filters are quite fast (the ones that eliminate red lips) but some of them are quite slow (the ones that detect particular shades of brown lipstick that give problems) and thus there is a significant speed-up for top-face regions without a loss of overall accuracy.

For eye-strip regions most of the advantages of top-face regions also hold. Technically these are not "detected eye regions" as the face strip is typically extracted by analyzing the horizontal variance across a face region and then "cutting out" the high variance region which contains the two eyes. Eye-Strip also enables removal of the Iris confirmation filter which is another slow filter.

Modifications for Portrait/Foreground Regions

The face filter will still be typically used for raw foreground image patches, although it can be eliminated for the three other types of such region. Most of the skin filters may typically still be used, although it is possible to reduce the region to which they are applied in the case of the various portrait images where only the narrower top portion (c. 50%) of the image will contain the face.

The exact selection of red-eye filters employed is very dependent on the particular algorithmic techniques employed within an imaging device for foreground-background separation or portrait region extraction. Thus a device-specific calibration would be involved.

A modified regional analysis can be applied in the case of a refined portrait where is it known that the full hair region is included in the geometric region and thus the top c. 20% of the region can be excluded from searches (excludes red hairclips, combs, flowers, etc). Skin filters may optionally be eliminated for the mid-region and replaced with a geometric check which is faster.

Additional methods of face-based image analysis are described in U.S. Pat. Nos. 7,362,368, 7,317,815, 7,269,292, 7,315,630, 7,403,643, and 7,315,631, and U.S. patent application Ser. Nos. 10/608,810, 10/608,887, 11/941,956, 10/608,888, 11/773,815, 11/773,855, 10/608,811, 11/024, 046, 11/765,899, 11/765,967, 10/608,772, 11/688,236, 10/608,784, 11/773,868, 10/764,339, 11/027,001, 11/833, 224, 12/167,500, 11/766,674, 12/063,089, 11/765,212, 11/765,307, 11/464,083, 11/460,218, 11/761,647, 11/624, 683, 12/042,104, 12/112,586, 12/026,484, 11/861,854, 12/055,958, 61/024,508, and 61/023,855 and PCT/US2006/021393, which are incorporated by reference along with other references cited above and below herein, and may be combined into alternative embodiments.

The image processing analysis may be performed in hardware. The changing of the degree of the subsampling may be determined based on image metadata information.

After prefiltering the subsampled image and determining the size and location of one or more types of partial face regions a red-eye filter is applied to each such determined region. Said filter is modified according to the type of partial face region and may also be modified according to the size of said region, its absolute location within the image and its relative location to other partial face regions.

In certain embodiments the results of a global red-eye analysis may be combined with the results of localized analyses within each such partial face region.

Various refined red-eye filters are described in U.S. Ser. Nos. 11/123,971, 11/233,513, 10/976,336, as well as 11/462, 035, 12/042,335, 11/282,954, 11/282,955, 12/043,025, 11/936,085, 11/859,164, 11/861,257, 61/024,551, and U.S. Pat. Nos. 6,407,777, 7,042,505, 7,352,394, and 7,336,821, and techniques from these co-pending applications may be advantageously employed in certain embodiments.

Example Process

In an exemplary process, a redeye detection algorithm may be applied on an entire image, which may be a low resolution image such as a preview or postview image. A red eye list may be obtained of regions suspected as candidate red eye regions. An extended eye detector may be applied to the image from which an extended eyes list is generated. Using one or more geometric operations, such as applying rectangles or other polygons or elliptical shapes to the image, a list is generated from the extended eyes list.

Redeye detection accuracy improvement is achieved when the red eye candidate region list is combined with the extended eyes list or the list discussed above as being generated therefrom by applying one or more geometric operations. Each eye- or eye pair-rectangle may be verified by intersecting the redeye candidate list. If not, a new refined red eye detection may be applied inside the eye- or eye pair-rectangle, e.g., based on the presence of the eye- or eye pair-rectangle, some filters (skin, face, lips, . . . ) could be relaxed, removed, and/or customized.

In certain embodiments, one can verify detected red eyes which are not inside an eye- or eye pair-rectangle as NOT being false positives. This can be done by increasing the strength of the filtering chain by, e.g., adding or customizing certain special filters. In certain embodiments, one can verify cases when two or more red eyes are detected in a same eye rectangle, or three or more red eyes are detected inside an eye- or eye pair-rectangle. In this case, external filtering can be applied, based on marks already computed during a main filtering chain. In certain embodiments, one can correlate for a pair of eyes inside an eye pair-rectangle.

A golden eyes detector may also be applied inside an eye- or eye pair-rectangles list. Optionally, a difference between a red eye candidate region list and an extended eyes list can be utilized. One can enlarge one or more of the rectangles and apply eye defect detection inside them. Correction is generally then applied for one or multiple defect eyes (Red, Golden, Zombie, White, etc.) on a full resolution image of the same scene as the subsampled image. In one example, golden eye correction may be applied second, thereby overwriting any red correction.

Detector

Examples of images upon which an extended eye detector may be used are shown in the images FIGS. 12A-12D. The digital images shown in these figures include partial face regions within red and green boxes that each include eyes with red eye defects.

Other regions outside the green and red boxes do not include any eyes and are not included within a subsample representation that is analyzed in certain embodiments in a process that includes modifying an area determined to be indicative of red eye phenomenon.

A flash-induced eye defect detector may be applied on an image downsampled to 320×240, for example. The green rectangles in FIGS. 12A-12D are examples of output of an extended eyes detector. The red rectangles in FIGS. 12A-12D are examples of eye rectangles and they may be computed directly from the green rectangles using only simple geometric operations (e.g., take the upper part, enlarge it a bit, and splash it in two parts).

An example process for defect eye detection and correction using extended eyes detector may be as follows. An original full image may be downsampled to 1024×768 resolution, for example. Red eye detection may be applied on the entire downsampled image to obtain a candidate red eye region list. An extended eyes detector is then applied, and also an eyes rectangles list is computed. A red eye detection accuracy improvement is achieved using the combination between the red eye candidate list and the extended eyes list.

The decision whether the filter should use a subsampled representation including one or more partial face regions, and the rate of the downsampling, may be determined empirically by a-priori statistically comparing the success rate vs. misdetection rate of a filter with the subsampling rate and technique of known images. The empirical determination will often be specific to a particular camera model. Thus, the decision to use the full sized image or the subsampled image data, for a particular pixel locating or false determining filter, may be empirically determined for each camera.

In another aspect, a pre-acquisition or precapture image may be effectively utilized in certain embodiments. Another type of subsampled representation of the image may be one that differs temporally from the captured image, in addition or alternative to the spatial differentiation with other aforementioned algorithms such as spline and bi-cubic. The subsample representation of the image may be an image captured before the final image is captured, and preferably just before. A camera may provide a digital preview of the image, which may be a continuous subsample version of the image. Such pre-capture may be used by the camera and the camera user, for example, to establish correct exposure, focus and/or composition.

The precapture image process may involve an additional step of conversion from the sensor domain, also referred to as raw-ccd, to a known color space that the red eye filter is using for calculations. In the case that the preview or precapture image is being used, an additional step of alignment may be used in the case that the final image and the pre-capture differ, such as in camera or object movement.

The pre-acquisition image may be normally processed directly from an image sensor without loading it into camera memory. To facilitate this processing, a dedicated hardware subsystem is implemented to perform pre-acquisition image processing. Depending on the settings of this hardware subsystem, the pre-acquisition image processing may satisfy some predetermined criteria which then implements the loading of raw image data from the buffer of the imaging sensor into the main system memory together with report data, possibly stored as metadata, on the predetermined criteria. One example of such a test criterion is the existence of red areas within the pre-acquisition image prior to the activation of the camera flash module. Report data on such red areas can be passed to the redeye filter to eliminate such areas from the redeye detection process. Note that where the test criteria applied by the pre-acquisition image processing module are not met then it can loop to obtain a new pre-acquisition test image from the imaging sensor. This looping may continue until either the test criteria are satisfied or a system time-out occurs. The pre-acquisition image processing step may be significantly faster than the subsequent image processing chain of operations due to the taking of image data directly from the sensor buffers and the dedicated hardware subsystem used to process this data.

Once the test criteria are satisfied, the raw image data may be then properly loaded into main system memory to allow image processing operations to convert the raw sensor data into a final pixelated image. Typical steps may include converting Bayer or RGGB image data to YCC or RGB pixelated image data, calculation and adjustment of image white balance, calculation and adjustment of image color range, and calculation and adjustment of image luminance, potentially among others.

Following the application of this image processing chain, the final, full-size image may be available in system memory, and may then be copied to the image store for further processing by the redeye filter subsystem. A camera may incorporate dedicated hardware to do global luminance and/or color/grayscale histogram calculations on the raw and/or final image data. One or more windows within the image may be selected for doing "local" calculations, for example. Thus, valuable data may be obtained using a first pass" or pre-acquisition image before committing to a main image processing approach which generates a more final picture.

A subsampled image, in addition to the precapture and more finalized images, may be generated in parallel with the final image by a main image processing toolchain. Such processing may be preferably performed within the image capture module 60 of FIG. 1.

Additional prefiltering may be advantageously performed on this subsampled image to eliminate regions of the final image from the red-eye analysis or to refine the parameters of the red-eye filter or adapt a red-eye filter chain according to regional characteristics. The use of a subsampled image is also helpful for performing analysis in playback mode, i.e. when an image is processed after image capture and thus when "live" preview images are not available a subsample image may be generated and used as a substitute for said preview image to speed up image processing algorithms.

Detailed description of how a red-eye filter chain may be adapted in response to the conditions of image acquisition or the quality of an acquired image, which may be incorporated into alternative embodiments, are provided in US patent references cited above and below herein.

An exemplary process may include the following operations. First, a raw image may be acquired or pre-captured. This raw image may be processed prior to storage.

This processing may generate some report data based on some predetermined test criteria. If the criteria are not met, the pre-acquisition image processing operation may obtain a second, and perhaps one or more additional, pre-acquisition images from the imaging sensor buffer until such test criteria are satisfied.

Once the test criteria are satisfied, a full-sized raw image may be loaded into system memory and the full image processing chain may be applied to the image. A final image and a subsample image may then ultimately preferably be generated.

Figure 11:
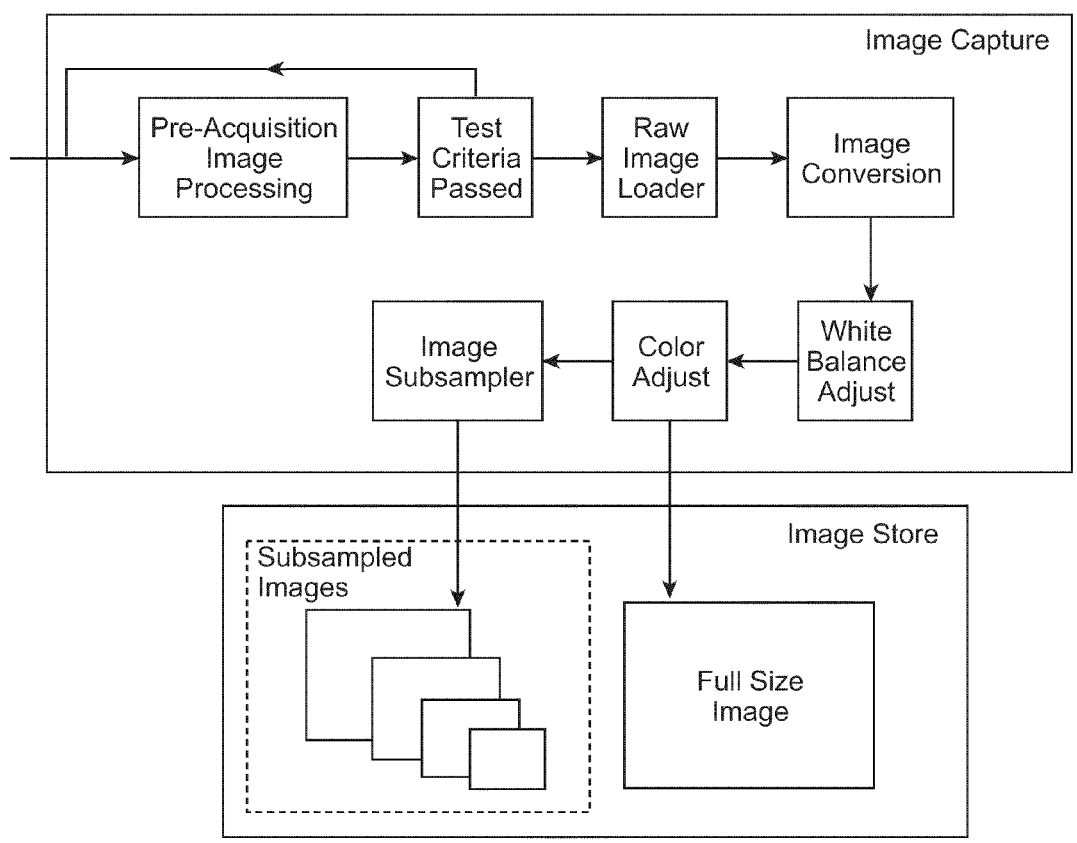
FIG. 11 illustrates in block form an exemplary arrangement in accordance with a precapture image utilization aspect.
Figure 12A:
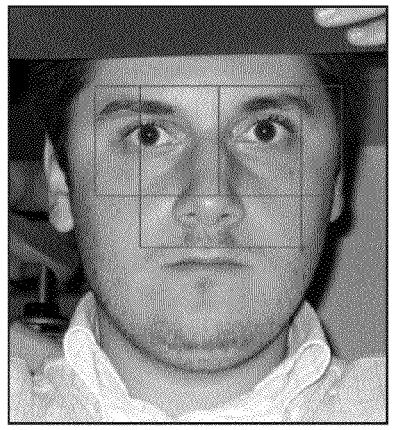
FIGS. 12A, 12B, 12C and 12D includes illustrative digital images having partial face regions within red and green boxes that each include eyes with red eye defects. Other regions outside the green and red boxes do not include any eyes and are not included within a subsample representation that is analyzed in certain embodiments in a process that includes modifying an area determined to be indicative of red eye phenomenon.
Figure 12B:
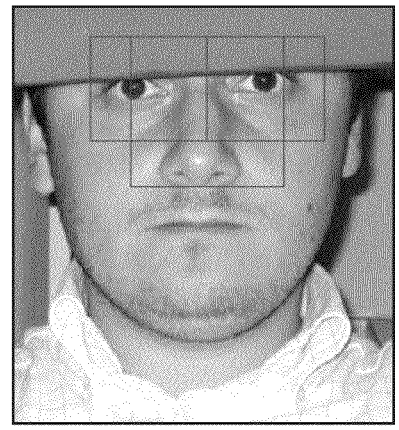
Figure 12C:
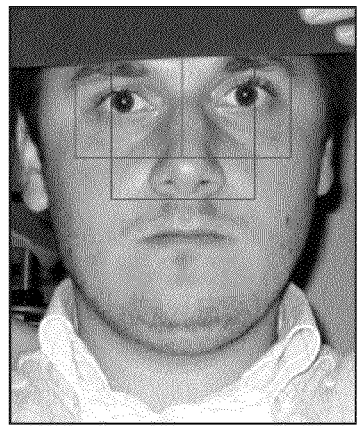
Figure 12D:
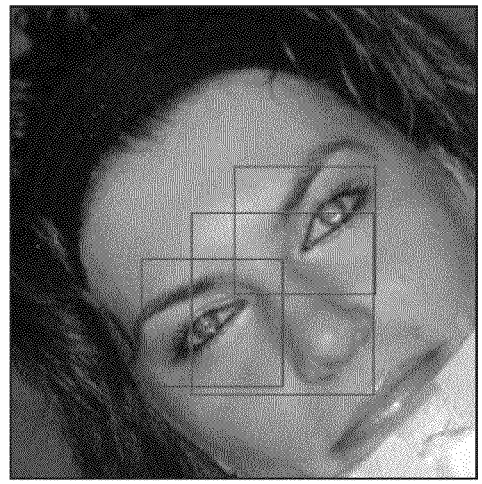

FIG. 11 illustrates in block form a further exemplary arrangement in accordance with a precapture image utilization aspect. After the pre-acquisition test phase, the "raw" image is loaded from the sensor into the image capture module. After converting the image from its raw format (e.g., Bayer RGGB) into a more standardized pixel format such as YCC or RGB, it may be then subject to a post-capture image processing chain which eventually generates a full-sized final image and one or more subsampled copies of the original. These may be preferably passed to the image store, and the red-eye filter is preferably then applied. Note that the image capture and image store functional blocks of FIG. 11 correspond to blocks 60 and 80 illustrated at FIG. 1.

Figure 2:
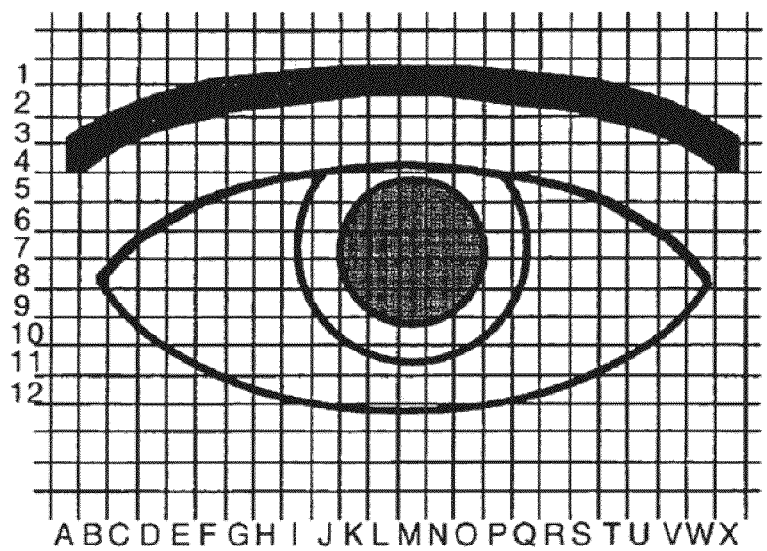
FIG. 2 shows a pixel grid upon which an image of an eye is focused.

FIG. 2 shows a pixel grid upon which an image of an eye is focused. Preferably the digital camera records an image comprising a grid of pixels at least 640 by 480. FIG. 2 shows a 24 by 12 pixel portion of the larger grid labeled columns A-X and rows 1-12 respectively.

Figure 3:
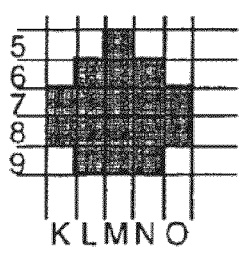
FIG. 3 shows pixel coordinates of the pupil of FIG. 2.

FIG. 3 shows pixel coordinates of the pupil of FIG. 2. The pupil is the darkened circular portion and substantially includes seventeen pixels: K7, K8, L6, L7, L8, L9, M5, M6, M7, M8, M9, N6, N7, N8, N9, O7 and O8, as indicated by shaded squares at the aforementioned coordinates. In a non-flash photograph, these pupil pixels would be substantially black in color. In a red-eye photograph, these pixels would be substantially red in color. It should be noted that the aforementioned pupil pixels have a shape indicative of the pupil of the subject, the shape preferably being a substantially circular, semi-circular or oval grouping of pixels. Locating a group of substantially red pixels forming a substantially circular or oval area is useful by the red-eye filter.

Figure 4:
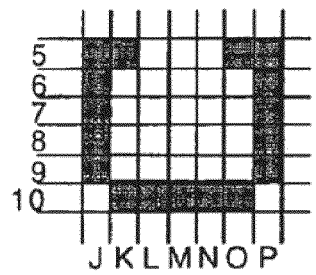
FIG. 4 shows pixel coordinates of the iris of FIG. 2.

FIG. 4 shows pixel coordinates of the iris of FIG. 2. The iris pixels are substantially adjacent to the pupil pixels of FIG. 2. Iris pixels J5, J6, J7, J8, J9, K5, K10, L10, M10, N10, O5, O10, P5, P6, P7, P8 and P9 are indicated by shaded squares at the aforementioned coordinates. The iris pixels substantially surround the pupil pixels and may be used as further indicia of a pupil. In a typical subject, the iris pixels will have a substantially constant color. However, the color will vary as the natural color of the eyes each individual subject varies. The existence of iris pixels depends upon the size of the iris at the time of the photograph, if the pupil is very large then iris pixels may not be present.

Figure 5:
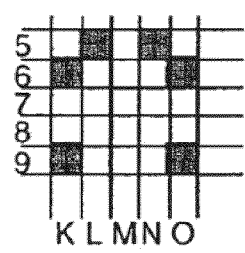
FIG. 5 shows pixel coordinates which contain a combination of iris and pupil colors of FIG. 2.

FIG. 5 shows pixel coordinates which include a combination of iris and pupil colors of FIG. 2. The pupil/iris pixels are located at K6, K9, L5, N5, O6, and O9, as indicated by shaded squares at the aforementioned coordinates. The pupil/iris pixels are adjacent to the pupil pixels, and also adjacent to any iris pixels which may be present. Pupil/iris pixels may also contain colors of other areas of the subject's eyes including skin tones and white areas of the eye.

Figure 6:
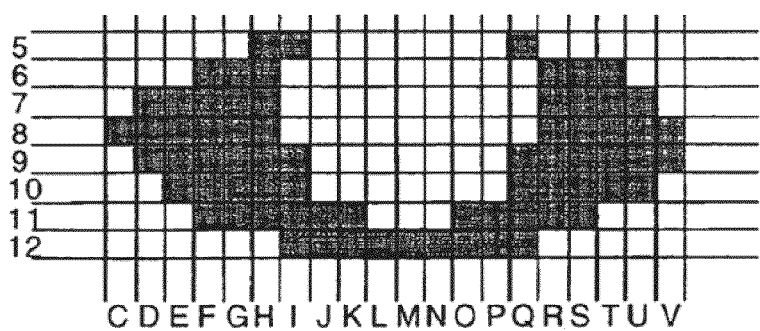
FIG. 6 shows pixel coordinates of the white eye area of FIG. 2.

FIG. 6 shows pixel coordinates of the white eye area of FIG. 2. The seventy one pixels are indicated by the shaded squares of FIG. 6 and are substantially white in color and are in the vicinity of and substantially surround the pupil pixels of FIG. 2.

Figure 7:
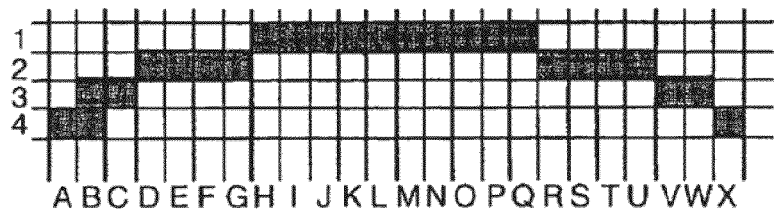
FIG. 7 shows pixel coordinates of the eyebrow area of FIG. 2.

FIG. 7 shows pixel coordinates of the eyebrow area of FIG. 2. The pixels are indicated by the shaded squares of FIG. 7 and are substantially white in color. The eyebrow pixels substantially form a continuous line in the vicinity of the pupil pixels. The color of the line will vary as the natural color of the eyebrow of each individual subject varies. Furthermore, some subjects may have no visible eyebrow at all.

It should be appreciated that the representations of FIG. 2 through FIG. 7 are particular to the example shown. The coordinates of pixels and actual number of pixels comprising the image of an eye will vary depending upon a number of variables. These variables include the location of the subject within the photograph, the distance between the subject and the camera, and the pixel density of the camera.

The red-eye filter 90 of FIG. 1 searches the digitally stored image for pixels having a substantially red color, then determines if the grouping has a round or oval characteristics, similar to the pixels of FIG. 3. If found, the color of the grouping is modified. In the preferred embodiment, the color is modified to black.

Searching for a circular or oval grouping helps eliminate falsely modifying red pixels which are not due to the red-eye phenomenon. In the example of FIG. 2, the red-eye phenomenon is found in a 5.times.5 grouping of pixels of FIG. 3. In other examples, the grouping may contain substantially more or less pixels depending upon the actual number of pixels comprising the image of an eye, but the color and shape of the grouping will be similar. Thus for example, a long line of red pixels will not be falsely modified because the shape is not substantially round or oval.

Additional tests may be used to avoid falsely modifying a round group of pixels having a color indicative of the red-eye phenomenon by further analysis of the pixels in the vicinity of the grouping. For example, in a red-eye phenomenon photograph, there will typically be no other pixels within the vicinity of a radius originating at the grouping having a similar red color because the pupil is surrounded by components of the subject's face, and the red-eye color is not normally found as a natural color on the face of the subject. Preferably the radius is large enough to analyze enough pixels to avoid falsing, yet small enough to exclude the other eye of the subject, which may also have the red-eye phenomenon. Preferably, the radius includes a range between two and five times the radius of the grouping. Other indicia of the recording may be used to validate the existence of red-eye including identification of iris pixels of FIG. 4 which surround the pupil pixels. The iris pixels will have a substantially common color, but the size and color of the iris will vary from subject to subject. Furthermore, the white area of the eye may be identified as a grouping of substantially white pixels in the vicinity of and substantially surrounding the pupil pixels as shown in FIG. 6. However, the location of the pupil within the opening of the eyelids is variable depending upon the orientation of the head of the subject at the time of the photograph. Consequently, identification of a number of substantially white pixels in the vicinity of the iris without a requirement of surrounding the grouping will further validate the identification of the red-eye phenomenon and prevent false modification of other red pixel groupings. The number of substantially white pixels is preferably between two and twenty times the number of pixels in the pupil grouping. As a further validation, the eyebrow pixels of FIG. 7 can be identified.

Further, additional criterion can be used to avoid falsely modifying a grouping of red pixels. The criterion include determining if the photographic conditions were indicative of the red-eye phenomenon. These include conditions known in the art including use of a flash, ambient light levels and distance of the subject. If the conditions indicate the red-eye phenomenon is not present, then red-eye filter 90 is not engaged.

FIG. 5 shows combination pupil/iris pixels which have color components of the red-eye phenomenon combined with color components of the iris or even the white area of the eye. The invention modifies these pixels by separating the color components associated with red-eye, modifying color of the separated color components and then adding back modified color to the pixel. Preferably the modified color is black. The result of modifying the red component with a black component makes for a more natural looking result. For example, if the iris is substantially green, a pupil/iris pixel will have components of red and green. The red-eye filter removes the red component and substitutes a black component, effectively resulting in a dark green pixel.

Figure 8:
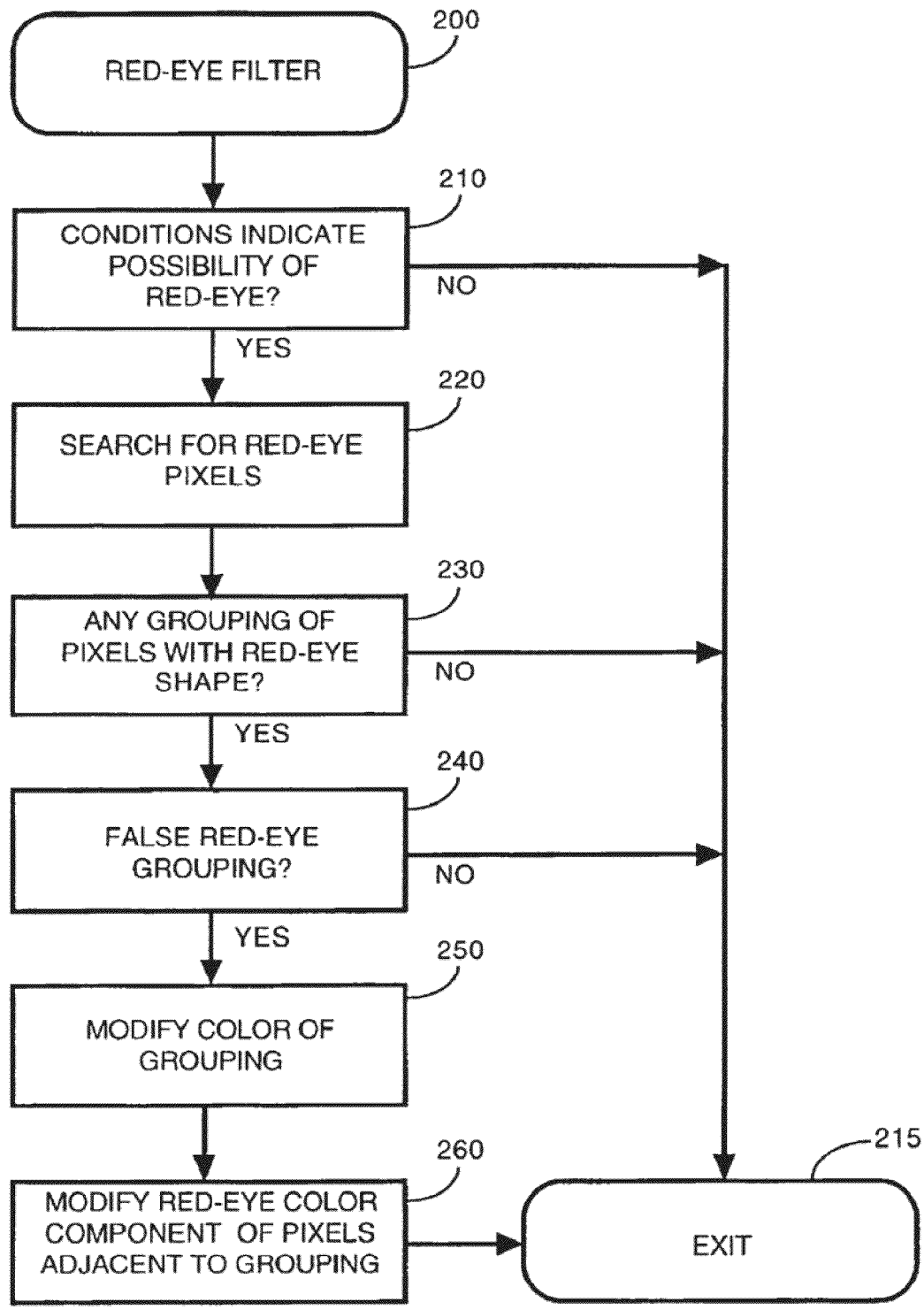
FIG. 8 shows a flow chart of a method operating in accordance with certain embodiments.

FIG. 8 shows a flow chart of a method operating in accordance with the present invention. The red-eye filter process is in addition to other processes known to those skilled in the art which operate within the camera. These other processes include flash control, focus, and image recording, storage and display. The red-eye filter process preferably operates within software within a .mu.C or DSP and processes an image stored in image store 80. The red-eye filter process is entered at step 200. At step 210 conditions are checked for the possibility of the red-eye phenomenon. These conditions are included in signals from exposure control means 30 which are communicated directly to the red-eye filter. Alternatively the exposure control means may store the signals along with the digital image in image store 80. If conditions do not indicate the possibility of red-eye at step 210, then the process exits at step 215. Step 210 is further detailed in FIG. 9, and is an optional step which may be bypassed in an alternate embodiment. Then is step 220 the digital image is searched of pixels having a color indicative of red-eye. The grouping of the red-eye pixels are then analyzed at step 230. Red-eye is determined if the shape of a grouping is indicative of the red-eye phenomenon. This step also accounts for multiple red-eye groupings in response to a subject having two red-eyes, or multiple subjects having red-eyes. If no groupings indicative of red-eye are found, then the process exits at step 215. Otherwise, false red-eye groupings are checked at optional step 240. Step 240 is further detailed in FIG. 10 and prevents the red-eye filter from falsely modifying red pixel groupings which do not have further indicia of the eye of a subject. After eliminating false groupings, if no grouping remain, the process exits at step 215. Otherwise step 250 modifies the color of the groupings which pass step 240, preferably substituting the color red for the color black within the grouping. Then in optional step 260, the pixels surrounding a red-eye grouping are analyzed for a red component. These are equivalent to the pixels of FIG. 5. The red component is substituted for black by the red-eye filter. The process then exits at step 215.

It should be appreciated that the pixel color modification can be stored directly in the image store by replacing red-eye pixels with pixels modified by the red-eye filter. Alternately the modified pixels can be stored as an overlay in the image store, thereby preserving the recorded image and only modifying the image when displayed in image display 100. Preferably the filtered image is communicated through image output means 110. Alternately the unfiltered image with the overlay may be communicated through image output means 110 to a external device such as a personal computer capable of processing such information.

Figure 9:
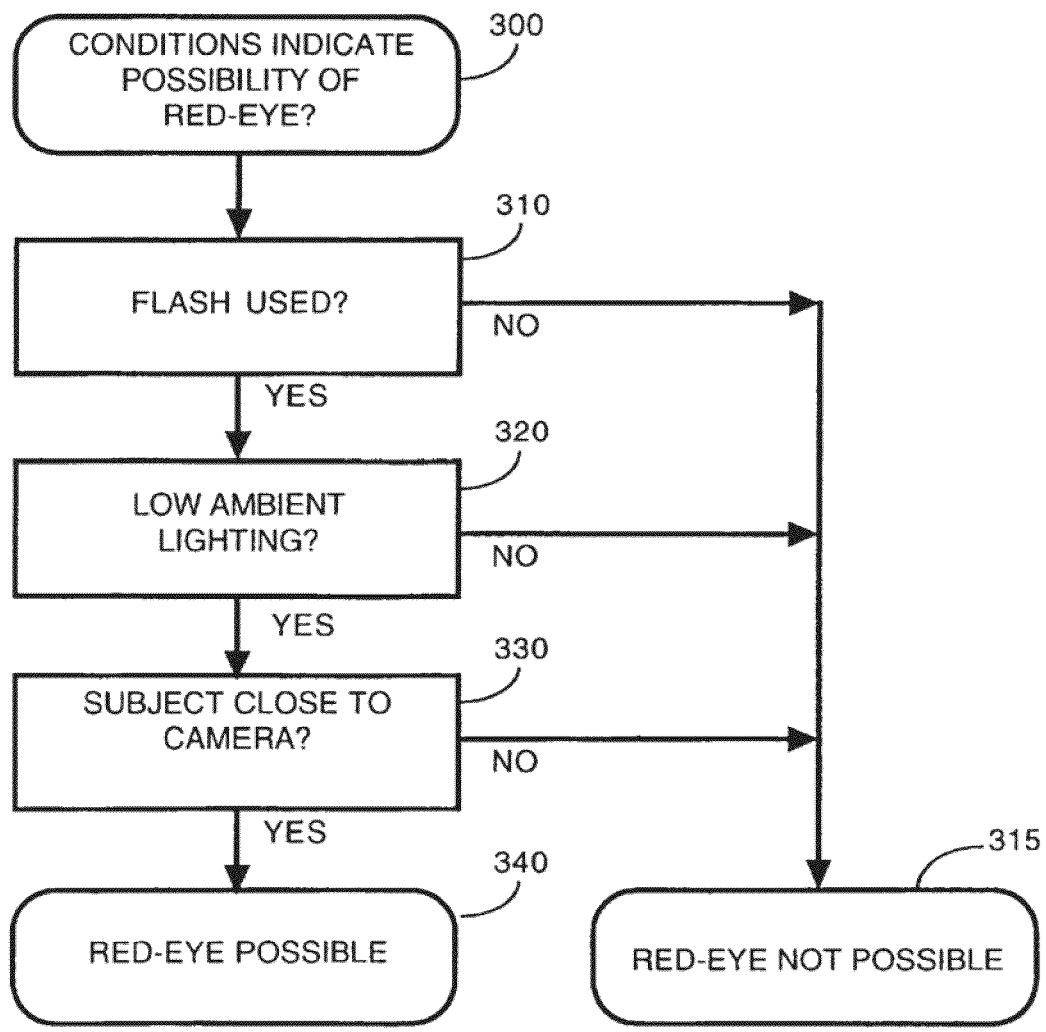
FIG. 9 shows a flow chart for testing if conditions indicate the possibility of a red-eye phenomenon photograph.

FIG. 9 shows a flow chart for testing if conditions indicate the possibility of a red-eye phenomenon corresponding to step 210 of FIG. 8. Entered at step 300, step 310 checks if a flash was used in the photograph. If not, step 315 indicates that red-eye is not possible. Otherwise optional step 320 checks if a low level of ambient light was present at the time of the photograph. If not, step 315 indicates that red-eye is not possible. Otherwise optional step 330 checks if the subject is relatively close to the camera at the time of the photograph. If not, step 215 indicates that red-eye is not possible. Otherwise step 340 indicates that red-eye is possible.

Figure 10:
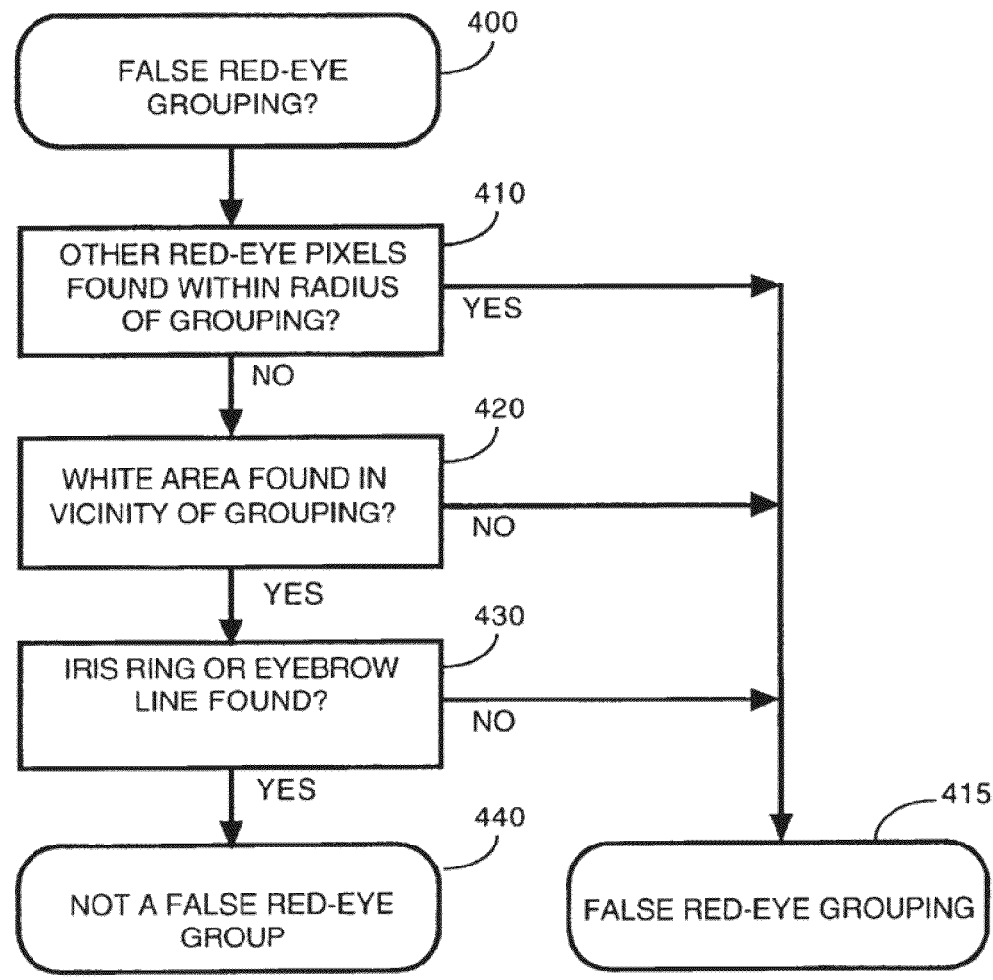
FIG. 10 shows a flow chart for testing if conditions indicate a false red-eye grouping.

FIG. 10 shows a flow chart for testing if conditions indicate a false red-eye grouping corresponding to step 240 of FIG. 8. Entered at step 400, step 410 checks if other red-eye pixels are found within a radius of a grouping. Preferably the radius is between two and five times the radius of the grouping. If found step 415 indicates a false red-eye grouping. Otherwise step 420 checks if a substantially white area of pixels is found in the vicinity of the grouping. This area is indicative of the white area of a subject's eye and has preferably between two and twenty times the number of pixels in the grouping. If not found step 415 indicates a false red-eye grouping. Otherwise step 430 searches the vicinity of the grouping for an iris ring or an eyebrow line. If not found, step 415 indicates a false red-eye grouping. Otherwise step 440 indicates the red-eye grouping is not false. It should be appreciated that each of the tests 410, 420 and 430 check for a false red-eye grouping. In alternate embodiments, other tests may be used to prevent false modification of the image, or the tests of FIG. 10 may be used either alone or in combination.

It should be further appreciated that either the red-eye condition test 210 or the red-eye falsing test 240 of FIG. 8 may be used to achieve satisfactory results. In an alternate embodiment test 240 may be acceptable enough to eliminate test 210, or visa versa. Alternately the selectivity of either the color and/or grouping analysis of the red-eye phenomenon may be sufficient to eliminate both tests 210 and 240 of FIG. 8. Furthermore, the color red as used herein means the range of colors and hues and brightnesses indicative of the red-eye phenomenon, and the color white as used herein means the range of colors and hues and brightnesses indicative of the white area of the human eye.

Thus, what has been provided is an improved method and apparatus for eliminating red-eye phenomenon within a miniature digital camera having a flash without the distraction of a pre-flash.

Partial Face Detection

Embodiments of the present invention include a method of using classifier chains to determine quickly and accurately if a window or sub-window of an image contains a right face, a left face, a full face, or does not contain a face. After acquiring a digital image, an integral image can be calculated based on the acquired digital image. One or more left-face (LF) classifiers can be applied to the integral image to determine the probability that the window contains a left face. One or more right-face (RF) classifiers can be applied to the integral image to determine the probability that the window contains a right face. If the probability of the window containing a right face and a left face are both greater than threshold values, then it can be determined that the window contains both a right face and a left face, i.e. a full face. If the probability of the window containing a right face is above a threshold value and the probability of the window containing a left face is below a threshold value, then it can be determined that the window contains a right face but no left face. If the probability of the window containing a right face is below a threshold value and the probability of the window containing a left face is above a threshold value, then it can be determined that the window contains a left face but no right face. If the probability of the window containing a right face and a left face are both below a threshold value, then it can be determined that the window does not contain a face.

Further embodiments of the present invention include applying a full-face classifier to a window of the integral image to verify the determination made based on the left-face classifiers and the right-face classifiers. For example, if the probability of the window containing a right face and a left face are both greater than threshold values, then applying a full-face classifier should show that it is highly probable that the window contains a full face because a full face includes a right face and a left face. If either the probability of the window containing a left face or a right face are below a threshold value, then a full-face classifier applied to the integral image should confirm that the window does not contain a full face. If the determination made when applying the right-face or left-face classifiers to the integral image contradicts the determination made when applying the full-face classifiers, then further, more computationally expensive analysis, can be performed to determine if the window contains a right face, left face, or full face.

Further embodiments of the present invention include using a right-face classifier to calculate a left-face classifier that is a mirror image of the right-face classifier, or using a left-face classifier to calculate a mirror right-face classifier.

Embodiments of the present invention also include a digital image acquisition system, having no photographic film, comprising means for carrying out one or more steps of the methods described in this application. Alternate embodiments of the present invention include one or more machine-readable storage media storing instructions which when executed by one or more computing devices cause the performance of one or more steps of the methods described in this application.

Digital Image Acquisition System

Figure 13:
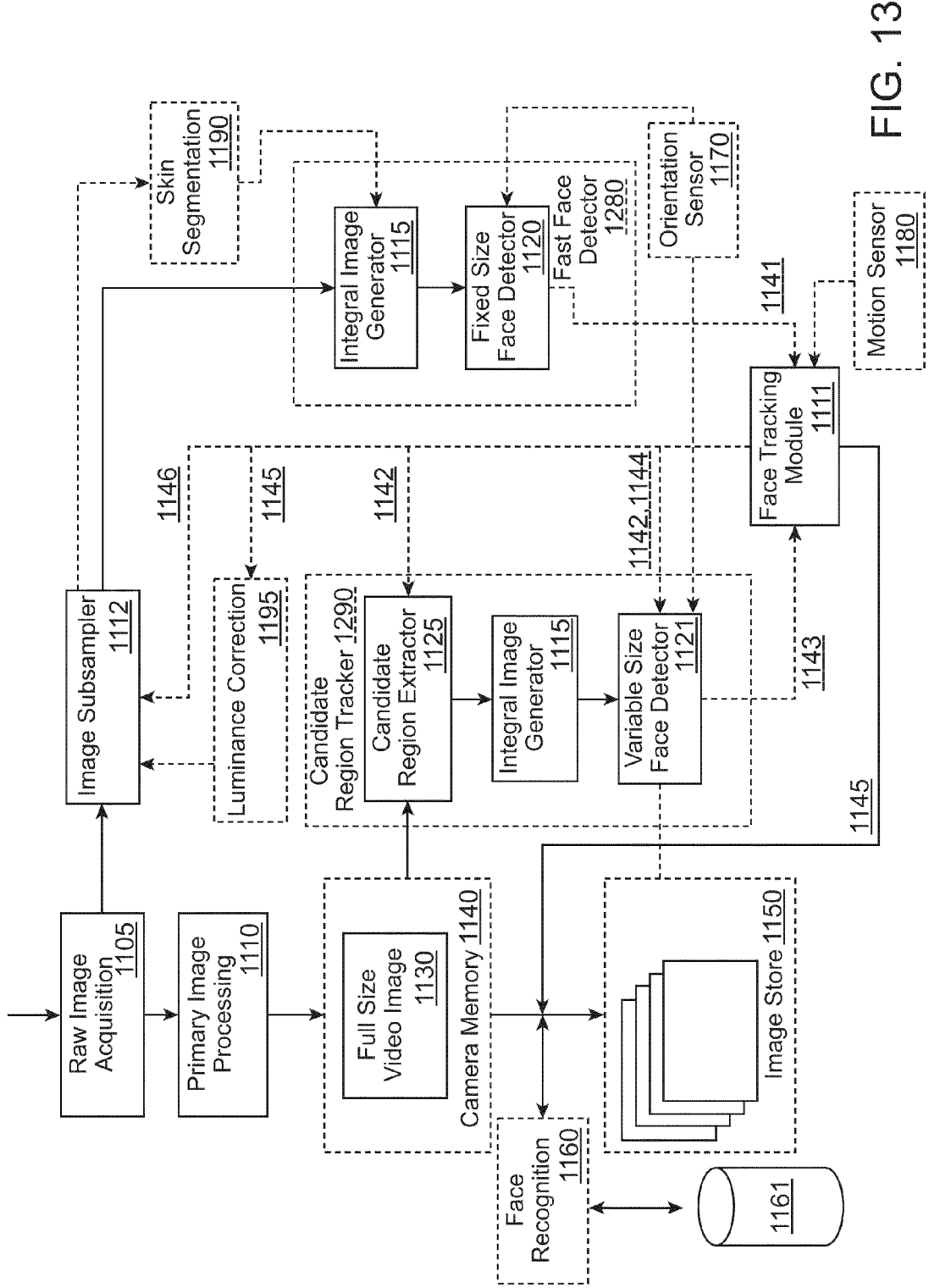
FIG. 13 shows the primary subsystems of a face tracking system in accordance with certain embodiments.

FIG. 13 shows the primary subsystems of a face tracking system in accordance with certain embodiments. The solid lines indicate the flow of image data; the dashed lines indicate control inputs or information outputs (e.g. location(s) of detected faces) from a module. In this example an image processing apparatus can be a digital still camera (DSC), a video camera, a cell phone equipped with an image capturing mechanism or a hand help computer equipped with an internal or external camera, or a combination thereof.

A digital image, i(x, y), is acquired in raw format from an image sensor 1105 such as a charged coupled device (CCD)

sensor or complimentary metal oxide semiconductor (CMOS) sensor. An image subsampler 1112 generates a smaller copy of the main image. Most digital cameras already contain dedicated hardware subsystems to perform image subsampling, for example to provide preview images to a camera display. Typically, the subsampled image is provided in bitmap format (RGB or YCC). In the meantime, the normal image acquisition chain performs post-processing on the raw image 1110 which typically includes some luminance and color balancing. In certain digital imaging systems, the subsampling may occur after such post-processing, or after certain post-processing filters are applied, but before the entire post-processing filter chain is completed.

The subsampled image is next passed to an integral image generator 1115 which creates an integral image from the subsampled image. The integral image, ii(x,y), at location (x, y) contains the sum of the pixel values above and to the left of point (x, y) from image i(x,y).

This integral image is next passed to a fixed size face detector 1120. The face detector is applied to the full integral image, but as this is an integral image of a subsampled copy of the main image, the processing involved in the face detection is proportionately reduced. If the subsampled image is ¼ of the main image, e.g., has ¼ the number of pixels and/or ¼ the size, then the processing time involved is only about 25% of that for the full image.

This approach is particularly amenable to hardware embodiments where the subsampled image memory space can be scanned by a fixed size DMA window and digital logic to implement a Haar-feature classifier chain can be applied to this DMA window. Several sizes of classifiers may alternatively be used (in a software embodiment), or multiple fixed-size classifiers may be used (in a hardware embodiment). An advantage is that a smaller integral image is calculated.

After application of the fast face detector 1280, any newly detected candidate face regions 1141 are passed onto a face tracking module 1111, where any face regions confirmed from previous analysis 1145 may be merged with new candidate face regions prior to being provided 1142 to a face tracker 1290.

The face tracker 1290 provides a set of confirmed candidate regions 1143 back to the tracking module 1111. Additional image processing filters are preferably applied by the tracking module 1111 to confirm either that these confirmed regions 1143 are face regions or to maintain regions as candidates if they have not been confirmed as such by the face tracker 1290. A final set of face regions 1145 can be output by the module 1111 for use elsewhere in the camera or to be stored within or in association with an acquired image for later processing either within the camera or offline. Set 1145 can also be used in a next iteration of face tracking.

After the main image acquisition chain is completed, a full-size copy of the main image 1130 will normally reside in the system memory 1140 of the image acquisition system. This may be accessed by a candidate region extractor 1125 component of the face tracker 1290, which selects image patches based on candidate face region data 1142 obtained from the face tracking module 1111. These image patches for each candidate region are passed to an integral image generator 1115, which passes the resulting integral images to a variable sized detector 1121, as one possible example a Viola-Jones detector, which then applies a classifier chain, preferably at least a 32 classifier chain, to the integral image for each candidate region across a range of different scales.

The range of scales 1144 employed by the face detector 1121 is determined and supplied by the face tracking module 1111 and is based partly on statistical information relating to the history of the current candidate face regions 1142 and partly on external metadata determined from other subsystems within the image acquisition system.

As an example of the former, if a candidate face region has remained consistently at a particular size for a certain number of acquired image frames, then the face detector 1121 is applied at this particular scale and/or perhaps at one scale higher (i.e. 1.25 times larger) and one scale lower (i.e. 1.25 times lower).

As an example of the latter, if the focus of the image acquisition system has moved to approximately infinity, then the smallest scalings will be applied in the face detector 1121. Normally these scalings would not be employed, as they would be applied a greater number of times to the candidate face region in order to cover it completely. It is worthwhile noting that the candidate face region will have a minimum size beyond which it should not decrease—this is in order to allow for localized movement of the camera by a user between frames. In some image acquisition systems which contain motion sensors, such localized movements may be tracked. This information may be employed to further improve the selection of scales and the size of candidate regions.

The candidate region tracker 1290 provides a set of confirmed face regions 1143 based on full variable size face detection of the image patches to the face tracking module 1111. Clearly, some candidate regions will have been confirmed while others will have been rejected, and these can be explicitly returned by the tracker 1290 or can be calculated by the tracking module 1111 by analyzing the difference between the confirmed regions 1143 and the candidate regions 1142. In either case, the face tracking module 1111 can then apply alternative tests to candidate regions rejected by the tracker 1290 to determine whether these should be maintained as candidate regions 1142 for the next cycle of tracking or whether these should indeed be removed from tracking.

Once the set of confirmed candidate regions 1145 has been determined by the face tracking module 1111, the module 1111 communicates with the sub-sampler 1112 to determine when the next acquired image is to be sub-sampled, and so provided to the detector 1280, and also to provide the resolution 1146 at which the next acquired image is to be sub-sampled.

Where the detector 1280 does not run when the next image is acquired, the candidate regions 1142 provided to the extractor 1125 for the next acquired image will be the regions 1145 confirmed by the tracking module 1111 from the last acquired image. On the other hand, when the face detector 1280 provides a new set of candidate regions 1141 to the face tracking module 1111, these candidate regions are preferably merged with the previous set of confirmed regions 1145 to provide the set of candidate regions 1142 to the extractor 1125 for the next acquired image.

Zoom information may be obtained from camera firmware. Using software techniques which analyze images in camera memory 1140 or image store 1150, the degree of pan or tilt of the camera may be determined from one image to another.

In one embodiment, the acquisition device is provided with a motion sensor 1180, as illustrated at FIG. 13, to determine the degree and direction of pan from one image to another, and avoiding the processing involved in determining camera movement in software.

Such motion sensor for a digital camera may be based on an accelerometer, and may be optionally based on gyroscopic principals within the camera, primarily for the purposes of warning or compensating for hand shake during main image capture. U.S. Pat. No. 4,448,510, to Murakoshi, which is hereby incorporated by reference, discloses such a system for a conventional camera, and U.S. Pat. No. 6,747,690, to Molgaard, which is also incorporated by reference, discloses accelerometer sensors applied within a modern digital camera.

Where a motion sensor is incorporated in a camera, it may be optimized for small movements around the optical axis. The accelerometer may incorporate a sensing module which generates a signal based on the acceleration experienced and an amplifier module which determines the range of accelerations which can effectively be measured. The accelerometer may allow software control of the amplifier stage which allows the sensitivity to be adjusted.

The motion sensor 1180 could equally be implemented with MEMS sensors of the sort which will be incorporated in next generation consumer cameras and camera-phones.

In any case, when the camera is operable in face tracking mode, i.e., constant video acquisition as distinct from acquiring a main image, shake compensation would typically not be used because image quality is lower. This provides the opportunity to configure the motion sensor 1180 to sense large movements by setting the motion sensor amplifier module to low gain. The size and direction of movement detected by the sensor 1180 is preferably provided to the face tracker 1111. The approximate size of faces being tracked is already known, and this enables an estimate of the distance of each face from the camera. Accordingly, knowing the approximate size of the large movement from the sensor 1180 allows the approximate displacement of each candidate face region to be determined, even if they are at differing distances from the camera.

Thus, when a large movement is detected, the face tracker 1111 shifts the locations of candidate regions as a function of the direction and size of the movement. Alternatively, the size of the region over which the tracking algorithms are applied may also be enlarged (and the sophistication of the tracker may be decreased to compensate for scanning a larger image area) as a function of the direction and size of the movement.

When the camera is actuated to capture a main image, or when it exits face tracking mode for any other reason, the amplifier gain of the motion sensor 1180 is returned to normal, allowing the main image acquisition chain 1105,1110 for full-sized images to employ normal shake compensation algorithms based on information from the motion sensor 1180.

An alternative way of limiting the areas of an image to which the face detector 1120 is to be applied involves identifying areas of the image which include skin tones. U.S. Pat. No. 6,661,907, which is hereby incorporated by reference, discloses one such technique for detecting skin tones and subsequently only applying face detection in regions having a predominant skin color.

In one embodiment, skin segmentation 1190 is preferably applied to a sub-sampled version of the acquired image. If the resolution of the sub-sampled version is not sufficient, then a previous image stored in image store 1150 or a next sub-sampled image can be used as long as the two images are not too different in content from the current acquired image. Alternatively, skin segmentation 1190 can be applied to the full size video image 1130.

In any case, regions containing skin tones are identified by bounding rectangles. The bounding rectangles are provided to the integral image generator 1115, which produces integral image patches corresponding to the rectangles in a manner similar to that used by the tracker integral image generator 1115.

Not only does this approach reduce the processing overhead associated with producing the integral image and running face detection, but in the present embodiment, it also allows the face detector 1120 to apply more relaxed face detection to the bounding rectangles, as there is a higher chance that these skin-tone regions do in fact contain a face. So for a Viola-Jones detector 1120, a shorter classifier chain can be employed to more effectively provide similar quality results to running face detection over the whole image with longer VJ classifiers required to positively detect a face.

Further improvements to face detection are also contemplated in other embodiments. For example, based on the fact that face detection can be very dependent on illumination conditions, such that small variations in illumination can cause face detection to fail and cause somewhat unstable detection behavior, in another embodiment, confirmed face regions 1145 are used to identify regions of a subsequently acquired sub-sampled image on which luminance correction may be performed to bring regions of interest of the image to be analyzed to the desired parameters. One example of such correction is to improve the luminance contrast within the regions of the sub-sampled image defined by confirmed face regions 1145.

Contrast enhancement may be used to increase local contrast of an image, especially when the usable data of the image is represented by close contrast values. Through this adjustment, intensities of pixels of a region when represented on a histogram, which would otherwise be closely distributed, can be better distributed. This allows for areas of lower local contrast to gain a higher contrast without affecting global contrast. Histogram equalization accomplishes this by effectively spreading out the most frequent intensity values.

The method is useful in images with backgrounds and foregrounds that are both bright or both dark. In particular, the method can lead to better detail in photographs that are overexposed or under-exposed.

Alternatively, this luminance correction can be included in the computation of an "adjusted" integral image in the generators 1115.

In another improvement, when face detection is being used, the camera application is set to dynamically modify the exposure from the computed default to a higher values (from frame to frame, slightly overexposing the scene) until the face detection provides a lock onto a face.

Further embodiments providing improved efficiency for the system described above are also contemplated. For example, face detection algorithms typically employ methods or use classifiers to detect faces in a picture at different orientations: 0, 90, 180 and 270 degrees. The camera may be equipped with an orientation sensor 1170, as illustrated at FIG. 13. This can include a hardware sensor for determining whether the camera is being held upright, inverted or tilted clockwise or counter-clockwise. Alternatively, the orientation sensor can comprise an image analysis module connected either to the image acquisition hardware 1105, 1110 or camera memory 1140 or image store 1150 for quickly determining whether images are being acquired in portrait or landscape mode and whether the camera is tilted clockwise or counter-clockwise.

Once this determination is made, the camera orientation can be fed to one or both of the face detectors 1120, 1121. The detectors may apply face detection according to the likely orientation of faces in an image acquired with the determined camera orientation. This feature can either significantly reduce the face detection processing overhead, for example, by avoiding the employment of classifiers which are unlikely to detect faces, or increase its accuracy by running classifiers more likely to detects faces in a given orientation more often.

Classifier Chains

FIGS. 14a-c show illustrations of a full human face, a face with the right side obstructed, and a face with the left side obstructed. FIG. 14a represents a full face 1200 with a left eye 1201, a right eye 1202, a front of the nose 1203, a space between the eyes 1204, a bridge of the nose 1205, lips 1207, a space between the nose and the lips 1206, and a left cheek 1208, and a right cheek 1209.

FIG. 14b represents a face similar to the face of FIG. 14a but with an obstruction 1210 blocking the right side of the face. In the context of a digital image acquired by a system such as that described in FIG. 13, the obstruction 1210 might be a person's hair, another face, or any other object obstructing the face. Throughout this disclosure, a face with an obstruction 1210 blocking a right portion of the face, as in FIG. 14b, will be referred to as a left face or a left-sided face. FIG. 14c represents a face similar to the face of FIG. 14a but with an obstruction 1220 blocking the left side of the face. Throughout this disclosure a face with an obstruction 1220 blocking a left portion of the face, as in FIG. 14c, will be referred to as a right face or a right-sided face.

FIGS. 15a-f show graphical representations of a chain of full-face classifiers, and graphical representations of those full-face classifiers applied to illustrations of full faces. Techniques of the certain embodiments include applying a first classifier of a chain of classifiers to a window of an image to determine if the window contains a first feature indicative of a full face. The determination may be binary and only produce a "pass" or "fail." Alternatively, the determination may produce a probability of the window containing a face, in which case "pass" or "fail" can be determined by whether the probability is above or below a threshold value. "Pass" or "fail" may also be determined by summing the results of multiple classifiers as opposed to being based on a single classifier in a chain.

If the window "passes" the classifier, then the feature of the classifier is detected in the window, and if the window "fails" the classifier, then the feature is not detected in the window. If the window does not contain the first feature, then the window can be identified as not containing a face, and no additional classifiers need to be applied to the window. If the window does contain the feature of the first classifier, then a second classifier can be applied to the window to determine if the window contains a second feature indicative of a face. If the window does not contain the second feature, then the image can be identified as not containing a face, and no additional classifiers need to be applied to the window. If the window does contain the second feature, then a third classifier can be applied to the window. This process can repeat itself until the window passes enough classifiers to indicate a high probability of the window containing a face, or until the window fails a classifier, indicating that the window does not contain a face. Typically, each subsequent classifier in a classifier chain detects different features, more features, or more accurate instances of features than did previously applied classifiers. By applying the simplest classifiers that require the least accuracy early in the chain, those windows that do not contain faces can be quickly identified and eliminated without requiring the computer processing needed to apply the more sophisticated and more accurate classifiers. The number and type of classifiers used can be determined by machine-training techniques known in the art.

Figure 15A:
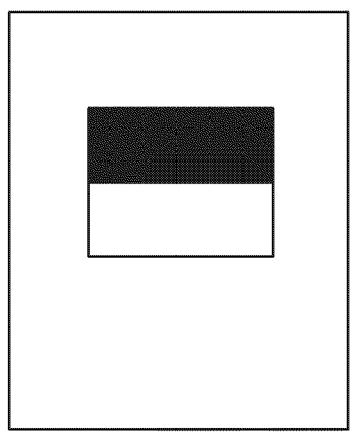
FIGS. 15a-g show graphical representations of full-face classifiers, and graphical representations of those full-face classifiers applied to illustrations of a full human face.
Figure 15B:
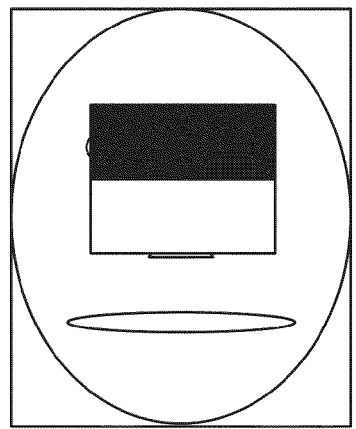

An example of a feature indicative of a face in a window is the area in a window corresponding to the eyes being darker than the area below the eyes. FIG. 15a is a graphical representation of a possible first classifier for detecting such a feature, and FIG. 15b shows a graphical representation of that first classifier applied to a window with a full face.

Figure 15C:
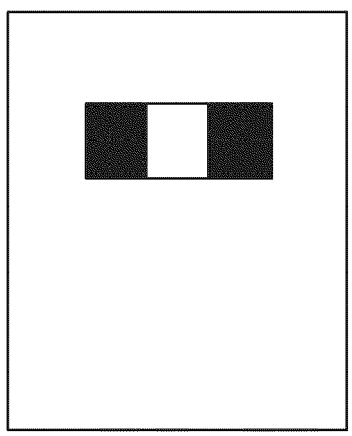
Figure 15D:
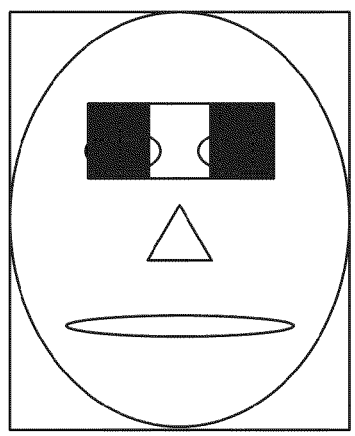
Figure 15E:
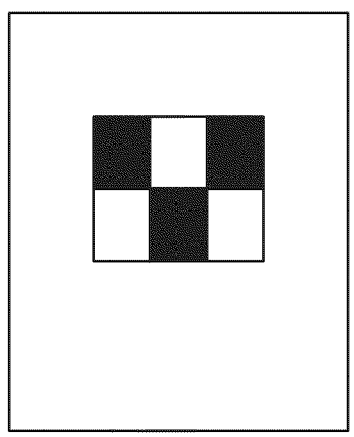
Figure 15F:
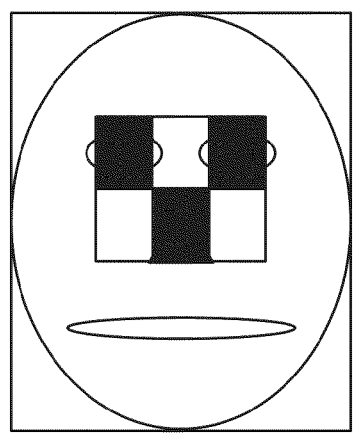

FIG. 15c is a graphical representation of a possible second classifier that might be applied to a window of an image if the window passes the first classifier shown in FIG. 15a. The classifier in FIG. 15c determines if the region corresponding to the eyes is darker than the region between the eyes, which is a second feature indicative of a face. FIG. 15d shows a graphical representation of the classifier in FIG. 15c applied to a window with a full face. FIG. 15e shows a graphical representation of a more complicated, more accurate classifier that can be applied to the window if the window passes the classifiers of FIGS. 15a and 15c. FIG. 15f shows the classifier of FIG. 15e applied to a window with a full face.

Figure 15G:
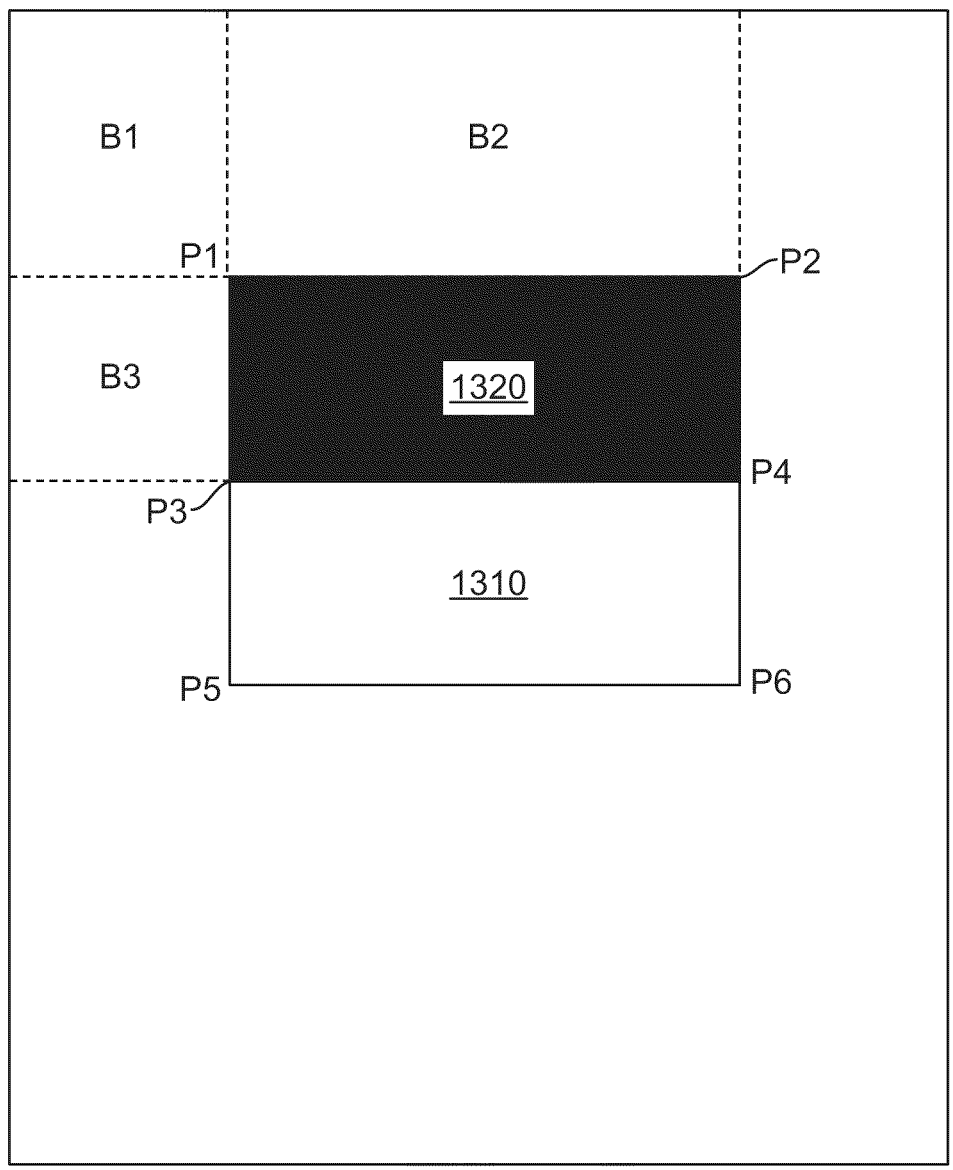

From the integral image, the sum of pixel values within a rectangular region of the image can be computed with four array references. For example, FIG. 15g is an enlarged graphical representation of the same classifier shown in FIG. 15a. The value of P1 represents the sum of pixel values above and to the left of point P1 (i.e. box B1). The value of P2 represents the sum of pixel values above and to the left of point P2 (i.e. boxes B1 and B2). The value of P3 represents the sum of pixels above and to the left of point P3 (i.e. boxes B1 and B3). The value of P4 represents the sum of pixels above and to the left of point P4 (i.e. boxes B1, B2, B3 and region 320). Accordingly, the sum of pixel values within region 1320 can be calculated from the four reference points P1, P2, P3, and P4 by the equation: sum region 1320=P4+P1−(P2+P3). A sum of pixel values can similarly be calculated for region 310 from reference points P3, P4, P5, and P6.

Using a look-up table, a probability that the window contains a face can be determined based on the difference in luminance between region 1320 and region 1310. The determined probability can be used to determine whether the window passes or fails the classifier or chain of classifiers.

FIGS. 16a-f show graphical representations of a chain of left-face classifiers, and graphical representations of those left-face classifiers applied to illustrations of a full face. The left-face classifiers can be applied to a window in the same manner described relative to the classifiers of FIGS. 15a-f, but instead of detecting features indicative of a full face, the classifiers are detecting features indicative of a left face. For example, in an image containing a left face, the area of an image corresponding to a portion of an eye will be darker than the area of the image corresponding to below the eye. FIG. 16a shows a graphical representation of a classifier for detecting such a feature, and FIG. 16b shows a graphical representation of the classifier of FIG. 16a applied to a full face. FIGS. 16c and 16e show examples of classifiers for detecting the presence of additional features, and FIGS. 16d and 16f shows graphical representations of those classifiers applied to full faces.

Figure 17C:
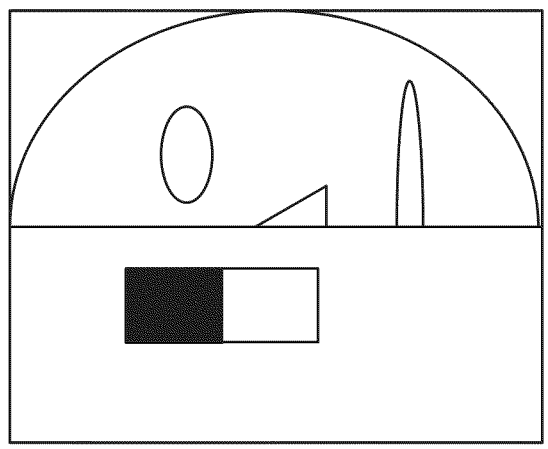
FIGS. 17a-c show a graphical representation of a left-face classifier applied to a left face, a full face, and a right face.
Figure 17B:
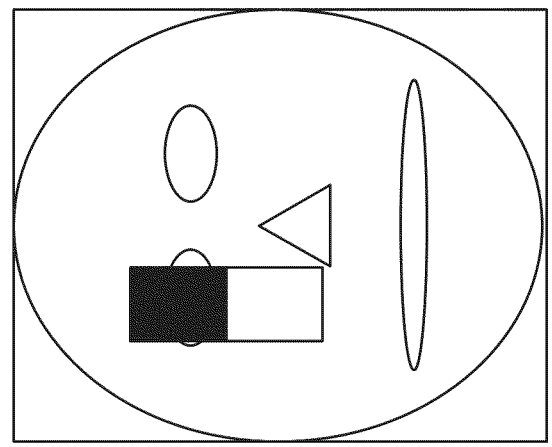
Figure 17A:
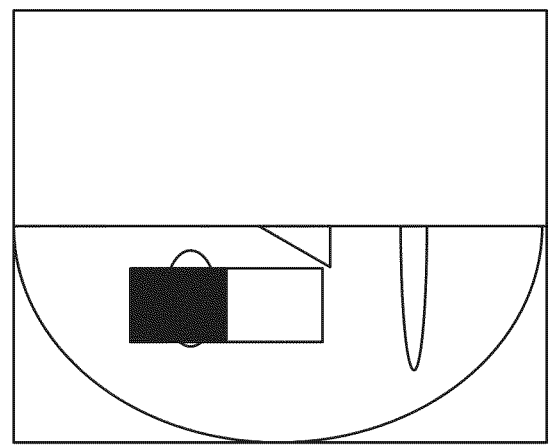

FIGS. 17a-c show a graphical representation of left-face classifiers applied to a window with a left face, a window with a full face, and a window with a right face. The left-face classifier detects in a window the presence of a darker region corresponding to an eye above a lighter region corresponding to a cheek. In FIG. 17a, the left-face classifier is applied to a window with a left face, in which case the window would pass the classifier indicating that the feature is present in the window. If the classifier is applied to a full face, as in FIG. 17b, the window will also pass because the feature is also present in the full face. If, however, the left-face classifier is applied to a right face, the window will fail because the feature is not present in the window. Thus, if a window passes a chain of left-face classifiers, it can be determined that the window contains either a left face or a full face. If the window fails a chain of left-face classifiers, then it can be determined that the window either contains a right face or contains no face.

The principles described in relation to FIGS. 16*a-f* and 17*a-c* can also be applied to a chain of right-face classifiers. If a window passes a chain of right-face classifiers, then the window contains either a right face or a full face. If the window fails a chain of right-face classifiers, then the window contains either a left face or contains no face.

Figure 18A:
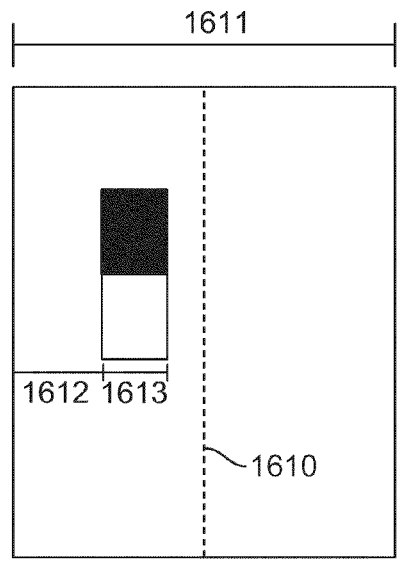
FIGS. 18a-d show graphical representations of left-face classifiers and corresponding right-face mirror classifiers.
Figure 18B:
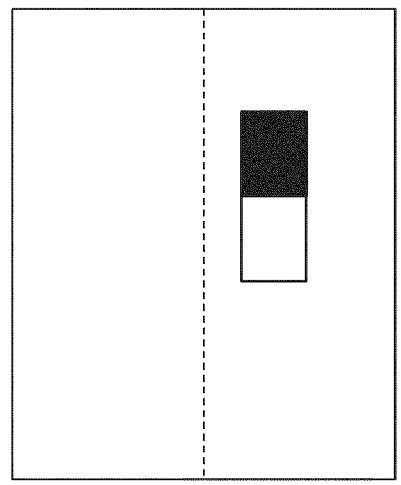
Figure 18C:
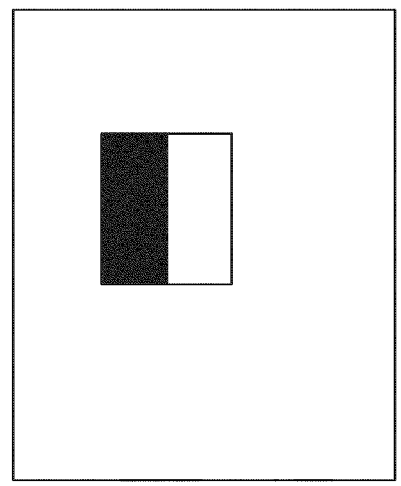
Figure 18D:
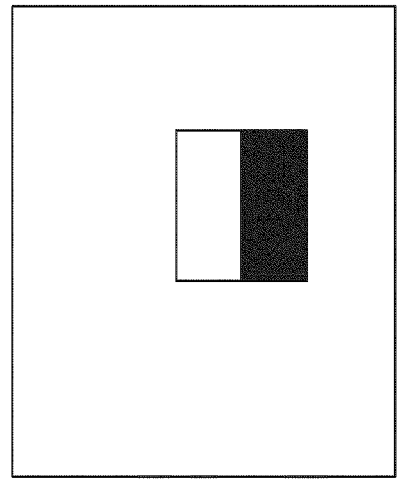

FIGS. 18*a-d* show graphical representations of left-face classifiers and right-face classifiers that are mirror classifiers of one another. A right-face mirror classifier detects the same feature as a left-face classifier, but detects that feature on the opposite side of a window which would correspond to the opposite side of the face. For example, the left-face classifier of FIG. 18*a* might detect a darker region on the left side of a window above a lighter region on the left side of a window, which would be indicative of a left eye and left cheek and thus indicative of a left face. The classifier of FIG. 18*b* is a mirror of the classifier of FIG. 18*a*. The classifier of FIG. 18*b* detects the presence of a darker region on the right side of a window above a lighter region on the right side of the window which would indicate a right eye above a right cheek and thus a right face. FIG. 18*c* shows another left-face classifier that is a mirror classifier of the right-face classifier illustrated by FIG. 18*d*. The classifiers in FIG. 18*b* and 18*d* can be viewed as the classifiers of FIGS. 18*a* and 18*c* having been flipped across a vertical axis of symmetry 1610.

Data Structure of a Classifier

Below are example data structures for Haar and Census classifiers:

```
typedef struct CensusFeature
{
    INT32 threshold;
    UINT8 type;
    UINT8 x, y;
    const INT16* lut;
    BOOL bSymetric;
} CensusFeature;
typedef struct HaarFeature
{
    INT32 threshold;
    UINT8 type;
    UINT8 x, y, dx, dy, shift;
    const INT16* lut;
    BOOL bSymetric;
} HaarFeature;
```

In the structures, "threshold" represents the threshold level used to determine if a region passes or fails a classifier or chain of classifiers.

In the structures, "type" represents the type of feature being detected. For example, the feature shown in FIG. 15*a* might be referred to as Haar2 vertical, and the feature shown in FIG. 15*c* might be referred to as Haar3 horizontal. The type of feature being detected determines how the classifier is applied to a window. For example, a horizontal-type classifier indicates that a difference in luminance is being detected between a left region and a right region as in FIG. 15*c*, while a vertical-type classifier indicates a difference in lumninance is being detected between a top region and a bottom region as in FIG. 15*a*.

In the structures, "x" and "y" represent the top, left coordinates of the feature in the base face size. For example, with reference to FIG. 15*g*, coordinates (x, y) would be the coordinates of point P1.

In the structures, "dx" and "dy" represent the dimension of the feature in the base face size. For example, with reference to FIG. 15*g*, dx would be the difference between the x-coordinate of point P2 and the x-coordinate of point P1, and dy would be the difference between the y-coordinate of point P5 and the y-coordinate of point P1.

In the structures, "lut" identifies the look up table containing the probabilities of a detected difference in luminance being indicative of a face.

In the structures, "bSymetric" represents a boolean value (true/false) used to specify whether the classifier has a mirror classifier.

If the value of bSymetric indicates that a mirror classifier exists, then the mirror classifier can be applied by determining a new value for the x-coordinate of the mirror classifier. The values of y, dx, dy, threshold, lut, and type will be the same for a classifier and that classifier's mirror classifier. The new value of x (referred to hereinafter as "x'") can be determined using known variables. For example, as shown in FIG. 18*b*, using the base face size 1611, the x-coordinate 1612, and dx 1613 from the features shown in FIG. 18*a*, x' can be calculated as x'=base face size−x−dx. The calculations used to determine other mirror classifiers may differ from the calculation shown for FIG. 18*b*, but the calculations will typically only involve addition and subtraction, which can be performed rapidly.

An aspect of an embodiment includes storing in memory, such as on a portable digital image acquisition device like the one shown in FIG. 13, a plurality of classifiers and using the techniques of an embodiment to determine mirror classifiers for the plurality of classifiers as opposed to storing both the classifiers and the mirror classifiers. The techniques of certain embodiments save on-board memory space and can be performed rapidly because the needed functions primarily comprise basic arithmetic.

Techniques of certain embodiments include a method for identifying a face in a window of an image, the method comprising: acquiring a digital image; computing an integral image based on the digital image; applying a first chain of one or more classifiers to the integral image to determine if the window contains a first portion of a face; applying a second chain of one or more classifiers to the integral image to determine if the window contains a second portion of a face; and determining, based at least in part on the presence or absence of the first portion of a face and the presence or absence of the second portion of a face, whether the window contains no face, a partial face, or a full face. In some embodiments, one or more classifiers of the second chain are mirror classifiers of one or more classifiers of the first chain. In some embodiments, the first chain of classifiers is to determine if a window contains a left face and the second chain of classifiers is to determine if the window contains a right face. In some embodiments, the method further comprises: applying a third chain of classifiers to verify the determining based at least in part on the presence or absence of the first portion of a face and the presence or absence of the second portion of a face. In some embodiments, the third set of classifiers is to determine if the window contains a full face.

Figure 19:
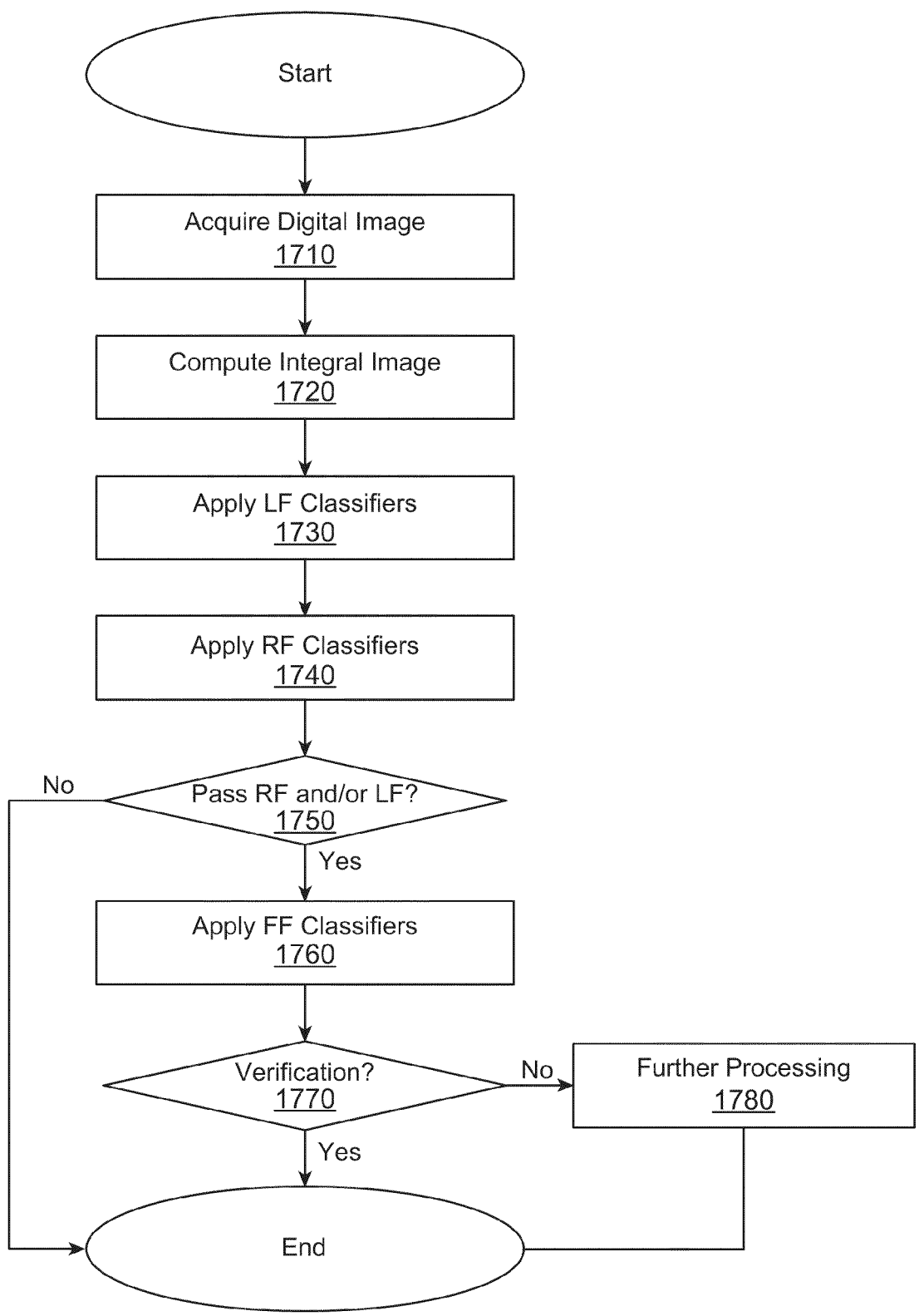
FIG. 19 shows a flow diagram of a method utilizing techniques of certain embodiments.

FIG. 19 is a flow diagram of a method embodying techniques of certain embodiments. The method includes acquiring a digital image (block 1710) and computing an integral image based on the acquired digital image (block 1720). Acquisition of the digital image and computation of the integral image can, for example, be performed by the digital image acquisition system as described in FIG. 13 or by a separate computing device such as a personal computer.

A chain of one or more left-face classifiers can be applied to a window of the integral image to determine if the window contains a left face (block 1730). Techniques of certain embodiments can include dividing the digital image into a plurality of different size windows and applying the one or more classifiers to all windows such that the entire image is analyzed to determine the presence of a left face in any window. In alternative embodiments, face-tracking techniques, such as those described in relation to the system of FIG. 13, can determine a subset of windows to apply the chain of classifiers such that the chain is only applied to windows that likely contain a face, thus improving the speed at which the method can be applied to an acquired digital image.

The method further comprises applying a chain of one or more right-face classifiers to the integral image to determine if a window contains a right face (block 1740). The right-face classifiers can be mirrors of the left-face classifiers as discussed in relation to FIGS. 18a-18d.

As described above in relation to FIGS. 15a-15g, the left-face classifiers and right-face classifiers can be applied as chains with each subsequent classifier in the chain providing more accuracy than previously used classifiers. Additionally, the right-face and left-face classifiers can be applied to the integral images either serially or in parallel. Further, when applying the classifier chains serially, the left-face classifiers can be applied prior to applying the right-face classifiers, or vice versa.

If, after applying both the left-face classifiers and the right-face classifiers, it is determined that the window contains neither a left face nor a right face, then the method can end (block 1750, "No" path). A determination that the window contains neither a right face nor a left face corresponds to the window not containing any face. If, after applying both the left-face classifiers and the right-face classifiers it is determined that the window contains a left face, a right face, or both (block 1750, "Yes" path), then a chain of full-face classifiers can be applied to the window (block 1760).

Applying the chain of full-face classifiers to the window can be used to verify the determinations made by applying the chains of left-face classifiers and right-face classifiers (block 1770). For example, if the chain of right-face classifiers indicates that the window contains a right face, and if the chain of left-face classifiers indicates that the window contains a left face, then applying a chain of full-face classifier should indicate that the window contains a full face. If either (a) the chain of right-face classifiers indicates the window does not contain a right face or (b) the chain of left-face classifiers indicates the window does not contain a left face, then applying a chain of full-face classifiers should indicate that the window does not contain a full face.

If applying the chain of full-face classifiers confirms the determinations made in blocks 1730 and 1740 (block 1770, "yes" path), then the method ends. If applying the chain of full-face classifiers contradicts the determinations made in blocks 1730 and 1740 (block 1770, "No" path), then further processing can occur to resolve the contradiction (block 1780). For example, additional, usually more computationally expensive, image analysis algorithms can be applied to the window to determine if the window contains a right face, left face, full face, or no face. Alternatively, probabilities or confidence levels of the right-face, left-face, and full-face chains can be compared to determine which one has the highest degree of confidence. After the further processing resolves the contradiction, the method can end.

Foreground/Background

Further embodiments include a method of distinguishing between foreground and background regions of a digital image of a scene. One or more foreground objects can be identified in a binary image map that distinguishes between foreground pixels and background pixels. From the one or more foreground objects, a primary foreground object can be identified, and based in part on the identified primary foreground object, a head region of the primary foreground object can be estimated. Within the head region, patterns of foreground pixels and background pixels that are indicative of a head crown region can be identified. Within the head crown region, pixels identified as background pixels that actually show portions of the primary foreground object can be converted to foreground pixels, thus improving the accuracy of the binary image map.

Digital Image Acquisition System

Figure 20:
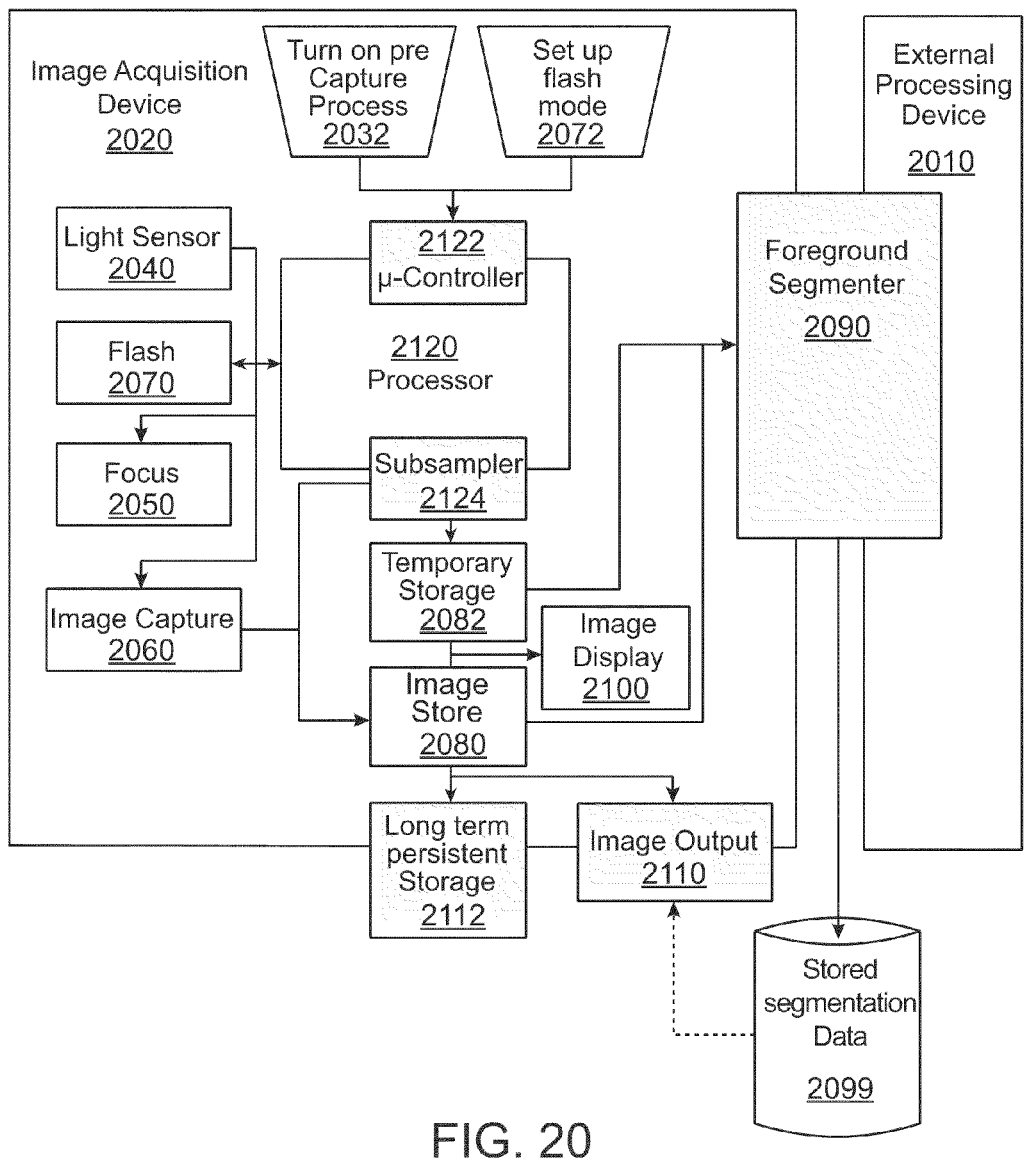
FIG. 20 shows a block diagram of a digital image acquisition device upon which certain embodiments may be implemented.

FIG. 20 shows a block diagram of a digital image acquisition device 2020 operating in accordance with a preferred embodiment. The digital image acquisition device 2020, which in the present embodiment might be a portable digital camera, includes a processor 2120. It can be appreciated that many of the processes implemented in the digital camera can be implemented in or controlled by software operating in a microprocessor, central processing unit, controller, digital signal processor and/or an application specific integrated circuit (ASIC), collectively depicted as block 2120 labeled "processor." Generically, user interface and control of peripheral components such as buttons and display is controlled by a micro-controller 2122.

The processor 2120, in response to a user input at 2122, such as half pressing a shutter button (pre-capture mode 2032), initiates and controls the digital photographic process. Ambient light exposure is determined using light sensor 2040 in order to automatically determine if a flash is to be used. The distance to the subject is determined using focusing means 2050 which also focuses the image on image capture component 2060. If a flash is to be used, processor 2120 causes the flash 2070 to generate a photographic flash in substantial coincidence with the recording of the image by image capture component 2060 upon full depression of the shutter button.

The image capture component 2060 digitally records the image in color. The image capture component 2060 is known to those familiar with the art and may include a CCD (charge coupled device) or CMOS to facilitate digital recording. The flash may be selectively generated either in response to the light sensor 2040 or a manual input 2072 from the user of the camera. The image I(x,y) recorded by image capture component 2060 is stored in image store component 2080 which may comprise computer memory such as dynamic random access memory or a non-volatile memory. The camera is equipped with a display 2100, such as an LCD, for preview and post-view of images.

In the case of preview images P(x,y), which are generated in the pre-capture mode 2032 with the shutter button half-pressed, the display 2100 can assist the user in composing the image, as well as being used to determine focusing and exposure. A temporary storage space 2082 is used to store one or a plurality of the preview images and can be part of the image store means 2080 or a separate component. The preview image is usually generated by the image capture component 2060. Parameters of the preview image may be recorded for later use when equating the ambient conditions with the final image. Alternatively, the parameters may be determined to match those of the consequently captured, full resolution image. For speed and memory efficiency reasons, preview images may be generated by subsampling a raw captured image using software 2124 which can be part of a general processor 2120 or dedicated hardware or combination thereof, before displaying or storing the preview image. The sub sampling may be for horizontal, vertical or a combination of the two. Depending on the settings of this hardware subsystem, the pre-acquisition image processing may satisfy some predetermined test criteria prior to storing a preview image. Such test criteria may be chronological—such as to constantly replace the previous saved preview image with a new captured preview image every 0.5 seconds during the pre-capture mode 2032, until the final full resolution image I(x,y) is captured by full depression of the shutter button. More sophisticated criteria may involve analysis of the preview image content, for example, testing the image for changes, or the detection of faces in the image before deciding whether the new preview image should replace a previously saved image. Other criteria may be based on image analysis such as the sharpness, detection of eyes or metadata analysis such as the exposure condition, whether a flash is going to happen, and/or the distance to the subjects.

If test criteria are not met, the camera continues by capturing the next preview image without saving the current one. The process continues until the final full resolution image I(x,y) is acquired and saved by fully depressing the shutter button.

Where multiple preview images can be saved, a new preview image will be placed on a chronological First In First Out (FIFO) stack, until the user takes the final picture. The reason for storing multiple preview images is that the last image, or any single image, may not be the best reference image for comparison with the final full resolution image. By storing multiple images, a better reference image can be achieved, and a closer alignment between the preview and the final captured image can be achieved in an alignment stage. Other reasons for capturing multiple images are that a single image may be blurred due to motion, the focus might not be set, and/or the exposure might not be set.

In an alternative embodiment, the multiple images may be a combination of preview images, which are images captured prior to the main full resolution image and postview images, which are images captured after said main image. In one embodiment, multiple preview images may assist in creating a single higher quality reference image, either by using a higher resolution or by taking different portions of different regions from the multiple images.

A segmentation filter 2090 analyzes the stored image I(x,y) for foreground and background characteristics before forwarding the image along with its foreground/background segmentation information 2099 for further processing or display. The filter 2090 can be integral to the camera 2020 or part of an external processing device 2010 such as a desktop computer, a hand held device, a cell phone handset or a server. In this embodiment, the segmentation filter 2090 receives the captured image I(x,y) from the full resolution image storage 2080. Segmentation filter 2090 also receives one or a plurality of preview images P(x,y) from the temporary storage 2082.

The image I(x,y) as captured, segmented and/or further processed may be either displayed on image display 2100, saved on a persistent storage 2112 which can be internal or a removable storage such as CF card, SD card, USB dongle, or the like, or downloaded to another device, such as a personal computer, server or printer via image output component 2110 which can be tethered or wireless. The segmentation data may also be stored 2099 either in the image header, as a separate file, or forwarded to another function which uses this information for image manipulation.

In embodiments where the segmentation filter 2090 is implemented in an external application in a separate device 2010, such as a desktop computer, the final captured image I(x,y) stored in block 2080 along with a representation of the preview image as temporarily stored in 2082, may be stored prior to modification on the storage device 2112, or transferred together via the image output component 2110 onto the external device 2010, later to be processed by the segmentation filter 2090. The preview image or multiple images, also referred to as sprite-images, may be pre-processed prior to storage, to improve compression rate, remove redundant data between images, align or color compress data.

Example Method

Figure 21:
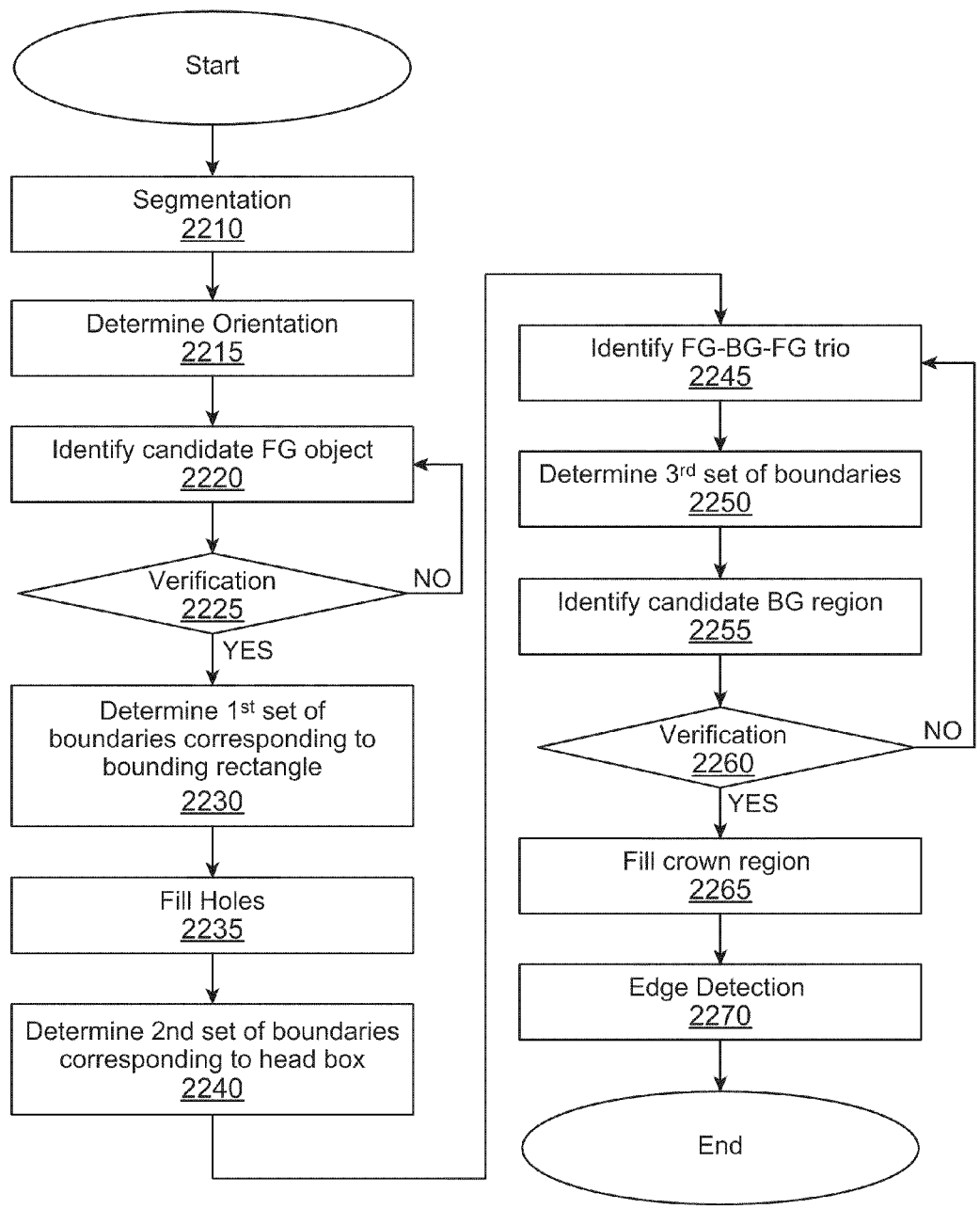
FIG. 21 shows a flow chart of a method embodying techniques of certain embodiments.

FIG. 21 is a flow chart showing a method according to certain embodiments. The segmentation filter 2090 of the image acquisition device 2020 (also referred to as a "camera" in parts of the disclosure) shown in FIG. 20 can use the foreground/background segmentation information 2099 of a stored image I(x,y) to produce a binary map with foreground (FG) pixels and background (BG) pixels (Block 2210). The binary map might, for example, assign a first value to background pixels and a second value to foreground pixels such that an image corresponding to the binary map shows the foreground image in black and the background in white. U.S. Patent Publication No. 2006/0039690, titled "Foreground/Background Segmentation In Digital Images With Differential Exposure Calculations," filed Aug. 30, 2005, is hereby incorporated by reference in its entirety. In one embodiment, the binary map is refined to improve the quality of the segmentation of a foreground object from the background of a digital image.

Depending on available features of the camera, a variable indicating the orientation of the stored image I(x,y) can be stored (Block 2215). The orientation of the stored image I(x,y) can identify whether the image is a portrait image or a landscape image. Thus, the orientation indicates which side of the image constitutes the top of the image, which side constitutes the right side of the image, and so on. As it can be assumed that the image was not captured while the camera was upside down, the orientation can be determined from three possible orientations (i.e., the camera was not rotated when the image was taken, the camera was rotated ninety degrees to the right, or the camera was rotated ninety degrees to the left). The variable can either indicate a certain orientation (OrCert) or an uncertain orientation (OrUncert) depending on how the orientation was determined. For example, if the user specifies the image orientation or if the image acquisition device contains motion sensing technology that can detect the rotation of the image acquisition device at the time of image capture, then an OrCert might be stored, indicating that the orientation is believed with a high degree of confidence to be accurate. Alternatively, if the orientation is determined from an analysis of an acquired image, such as by assuming that the side of the image with the highest average intensity is the top of the image, then an OrUncert might be stored, indicating that the orientation is based on estimates that cannot guarantee accuracy to the same degree. If a value for OrUncert is stored, additional information or additional algorithms such as face detection algorithms might be used in order to confirm the orientation.

After the orientation of the image has been determined, groups of foreground pixels on the binary image map can be labeled, and the group constituting the primary foreground object can be identified (block 2220). Each continuous region of foreground pixels can be given a unique label. The labeled regions can then be filtered to determine which continuous region constitutes the primary foreground object. The continuous region of foreground pixels with the largest pixel area can be identified as the primary foreground object, and continuous regions of foreground pixels that do not have the largest pixel area can be identified as not being the primary foreground object. These lesser regions are converted to background pixels.

In some embodiments, the continuous region of foreground pixels with the largest pixel area might not be automatically identified as the primary foreground object, but instead might be subjected to further analysis. For example, if the continuous region of foreground pixels with the largest pixel area does not touch the bottom of the image, as determined by the stored orientation, then the region might be discarded in favor of the second largest continuous region of foreground pixels (block 2225, no path). If the second largest region does touch the bottom of the image, then the second largest region can be confirmed as being the primary foreground object (block 2225, yes path). Additional regions can continue to be analyzed until one that touches the bottom of the image is identified. If no region touches the bottom of the image, then the technique stops.

Figure 22A:
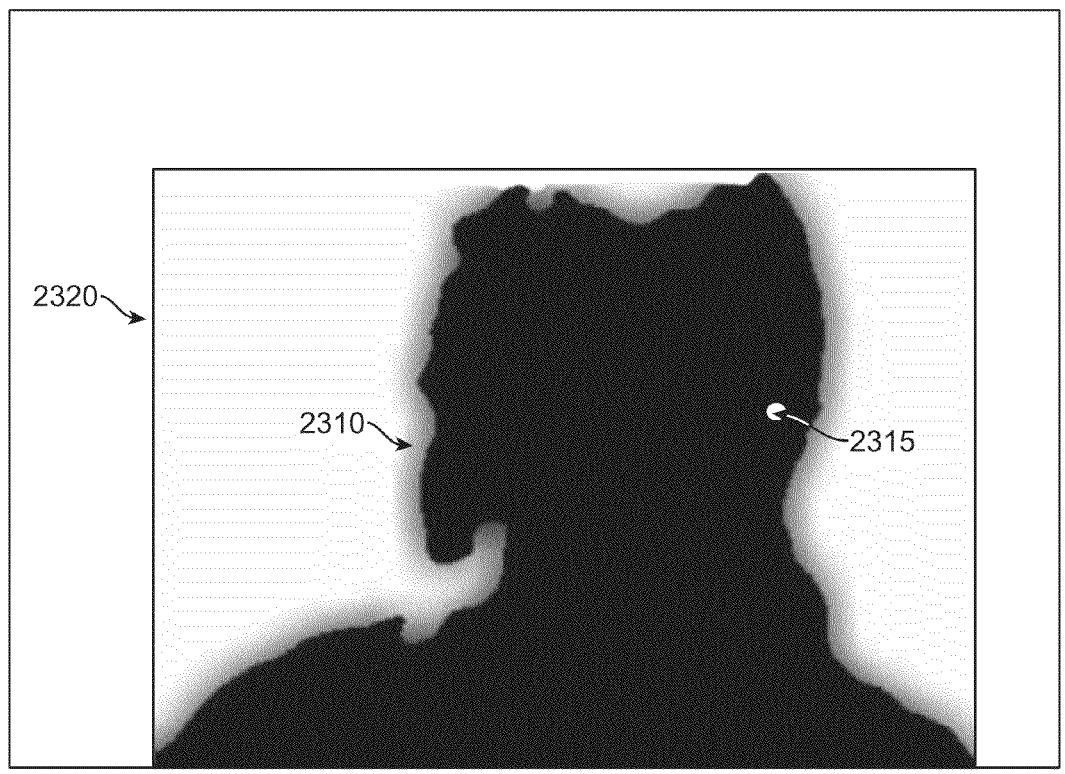
FIGS. 22a-c show examples of binary image maps at various stages of the method of FIG. 21.

After the labeling and filtering (blocks 2220 and 2225), the binary image map will contain only the primary foreground object. From the binary image map containing the primary foreground object, a first set of boundaries, corresponding to a bounding rectangle, can be determined (block 2230). The left boundary of the first set of boundaries can correspond to the left-most foreground pixel of the foreground object. The right boundary of the first set of boundaries can correspond to the right-most foreground pixel of the primary foreground object. The top boundary of the first set of boundaries can correspond to the top-most foreground pixel of the primary foreground object, and the bottom boundary can correspond to the bottom-most pixel of the primary foreground, which will typically be the bottom border of the image. FIG. 22a shows an example of a binary image map containing a single foreground object (2310) and a bounding rectangle (2320) corresponding to the first set of boundaries.

Figure 22B:
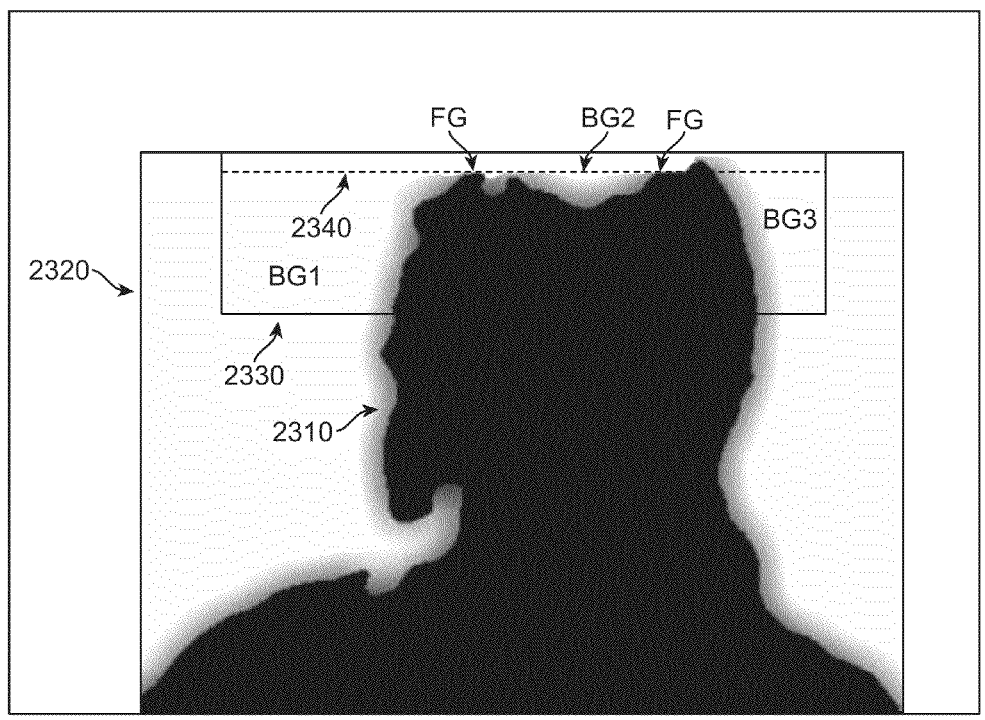

After the primary foreground object is identified (blocks 2220 and 2225) and a first set of boundaries is determined (block 2230), holes in the primary foreground object can be filled (block 2235). For example, a dark unreflective surface, such as from clothing or another object, might cause a pixel to be identified as a background pixel even though it represents the primary foreground object, and therefore should be identified on the binary image map as a foreground pixel. FIG. 22a shows an example of a hole 2315 in the primary foreground object. In FIG. 22b, the hole has been filled.

Holes can be identified by identifying regions of background pixels that meet one or more criteria. For example, any continuous region of background pixels that is entirely surrounded by foreground pixels and does not touch any of the first set of boundaries identified by the bounding rectangle 2320 of FIG. 22a can be identified as a hole. Groups of background pixels identified as holes can be changed to foreground pixels. In order to avoid incorrectly converting regions of background pixels that should not be converted, one embodiment only involves converting holes to foreground pixels if the hole constitutes less than a threshold amount of area, such as less than a certain percentage of the total image area, less than a certain percentage of the total area of foreground pixels, or less than a certain percentage of the total area of background pixels. The certain percentages are generally low, such as 1.5%, and can be chosen in order to prevent converting large background regions that might result from situations such as a person creating a hole by touching his head during image capture.

After the holes are filled, a second set of boundaries, corresponding to a head region box likely to define the head region of the foreground object, can be defined (block 2240). The second set of boundaries can be defined based on the orientation of the digital image as well as the first set of boundaries corresponding to the bounding rectangle. For example, the width of the head box might be defined to be three-fourths of the width of the bounding rectangle and aligned to the middle of the bounding rectangle, such that one-eighth of the bounding rectangle is to the left of the head box, and one-eighth of the bounding rectangle is to the right of the head region box. The head box might also be defined as being one-fourth the height of the bounding rectangle and aligned to the top of the bounding rectangle. Alternatively, the boundaries of the head box might be defined based on an estimated location for a face determined by one or more face detection algorithms. FIG. 22b shows an example of a binary image map with a head box 2330.

A recursive crown detection and filling module (RCDF module) can identify crowns within the head box 2330 by parsing each row within the head box 2330 to determine if it contains a FG-BG-FG trio (block 2245). A FG-BG-FG trio is a horizontal line or plurality of horizontal lines that has a first group of foreground pixels to the left of a group of background pixels and a second group of foreground pixels to the right of the group of background pixels. The RCDF module can analyze the top row of the head region box 2330 to determine if it contains a FG-BG-FG trio, and if it does not, then the RCDF can analyze the second row from the top to determine if it contains a FG-BG-FG trio. This process can be repeated until the first row from the top that contains a FG-BG-FG trio is identified. The first row from the top that contains a FG-BG-FG trio can be referred to as a trio line 2340. FIG. 22b shows an example of a binary map with a trio line 2340. If no trio line is found within the head region box 2330, then the algorithm can stop.

To avoid falsely identifying portions of the image as head crowns that are not head crowns, additional parameters can be used in identifying a trio line 2340. For example, the RCDF module might be configured to only find FG-BG-FG trios where the left and/or right groups of FG pixels are at least five pixels wide. Such a search criteria might prevent the RCDF module from identifying small details in the image, caused by stray hairs for example, as representing crowns. Additionally, the RCDF might be configured to only identify FG-BG-FG trios where the group of BG pixels is smaller than a certain width, such as 50 pixels. Such criteria can prevent the RCDF from identifying objects extraneous to the head, such as a raised hand, as representing the beginning of a head crown.

The trio line 2340 can be used to identify a third set of boundaries corresponding to a new box of interest (also called the crown box), and within the crown box, background regions can be identified (block 2250). The left, right, and bottom of the crown box can correspond to the same boundaries as the left, right, and bottom of the head region box 2330, but the top of crown box can be defined by the trio line 2340. Within the crown box, each unique background region can be assigned a unique label. In FIG. 22b, these labels are shown as BG1, BG2, and BG3. Based on an analysis, it can be determined which identified BG regions represent the crown region and which represent actual background (block 2255). For example, BG regions that touch the sides or the bottom of the crown box, such as BG1 and BG3, might be indentified as actual background regions, while a region or regions that do not touch the sides or bottom of the crown box, such as BG2, might be indentified as the crown region.

In some embodiments, regions identified as possibly being part of the crown region, such as BG2 in FIG. 22*b*, can undergo additional tests to verify whether or not the region in fact represents an actual crown region (block 2260). For example, the average luminescence of the crown region can be compared to the average luminescence of a group of foreground pixels in the surrounding foreground image. The comparison can be made on a grey scale image obtained using a flash. The determination of whether a pixel is a foreground pixel or a background pixel is binary and based on whether the change in luminescence between a flash image and non-flash image is greater than a certain value. Therefore, it can be assumed that the difference in luminescence between a background pixel in the crown region and an adjacent foreground pixel will be relatively small when compared to a foreground pixel and an actual background pixel.

If the identified crown region passes the additional tests (block 2260, yes path), then the pixels comprising the crown region can be converted from background pixels to foreground pixels (block 2265). If the identified crown region does not pass the additional tests (block 2260, no path), then the identified crown region can be marked as already tested, and the pixels will not be converted from background to foreground pixels. In response to the identified crown region not passing the additional test (block 2260, no path), another trio line can be identified and the process can repeat (blocks 2245, 2250, 2255, and 2260).

Figure 22C:
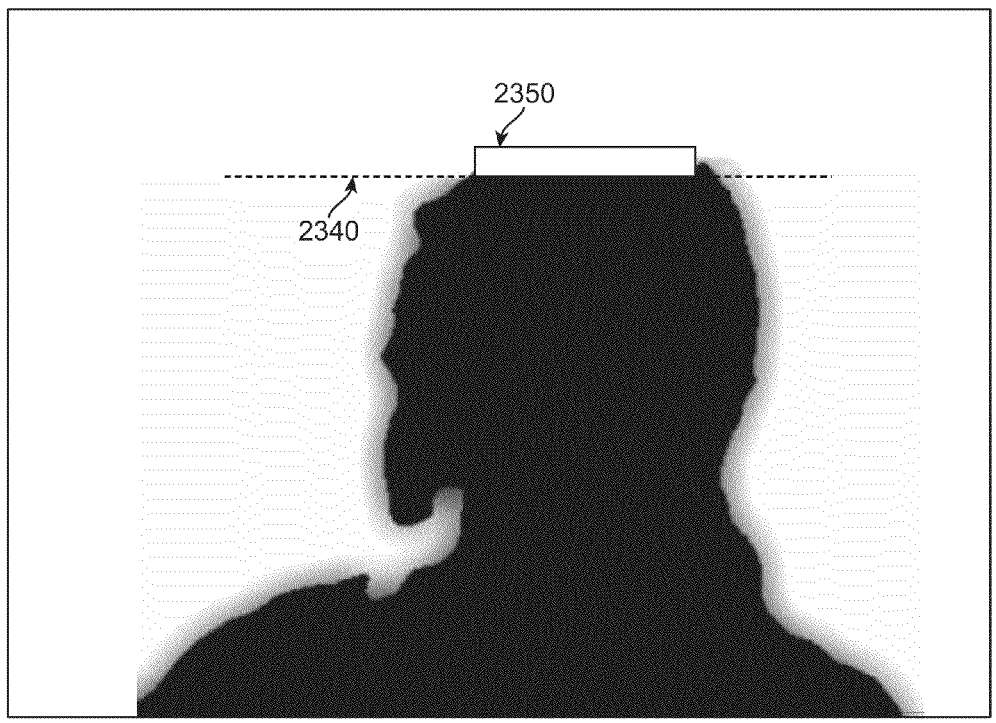

After filling an identified crown region that passes the additional tests (blocks 2260 and 2265), edge detection can be used to identify a top of the crown that might be above a filled in identified crown region (i.e. above a trio line) (block 2270). A region above the top of the crown can be identified as a region of interest 2350. FIG. 22*c* shows, the image of FIG. 22*b* with the crown region filled. FIG. 22*c* also shows a box corresponding to the region of interest 2350. The region of interest 2350 can be bounded on the top by a line that is a predetermined, maximum height above the trio line 2340 and can be bounded on the left and right by the width of the FG-BG-FG trio, such that the region of interest 2350 is bound on the left by the left-most FG pixel in the FG-BG-FG trio and bound on the right by the right-most FG pixel in the FG-BG-FG trio.

Within the region of interest 2350, a starting point can be defined. The starting point might, for example, provide one pixel above the trio line 2340 and equidistant from both the left and right sides of the region of interest 2350. Starting at the defined starting point, a region growing algorithm can be executed, and the growing can be stopped when the borders of region of interest are reached or when edges are determined. Any edge detecting algorithm known in the art, such as the Prewitt edge detection algorithm, can be used to determine edges of the head.

The edges determined by the edge detecting algorithm can be verified for accuracy. For example, if the detected edges exceed the region of interest 2350, then the edges can be identified as inaccurate, and if the detected edges are within the region of interest, then the edges can be identified as accurate. In response to determining that detected edges are accurate, the area bound by the detected edges may be added to the foreground map, and in response to determining that the detected edges are not accurate, the area bound by the detected edges is not added to the foreground map.

Techniques of certain embodiments can further include a warning module for detecting possibly incorrect filling. A detection of incorrect filling can be stored as metadata associated with a captured image and used to inform a user that crown filling has been performed. A message informing the user can be delivered to a user on the image acquisition device soon after the image is acquired or delivered to the user during post-acquisition processing that might occur, for example, on a personal computer. Alternatively, a camera might be programmed to present a user with an unaltered image instead of an imaged with crown filling if possibly incorrect filling has been detected.

Such a warning might be presented to a user every time filling is performed or only under certain circumstances. For example, the warning module might only present a warning to the user if the ratio of an object's perimeter to the object's area is greater than a certain value. A low perimeter to area ratio can be indicative of a lack of detail on that object, which might be attributable to incorrect filling.

Figure 23A:
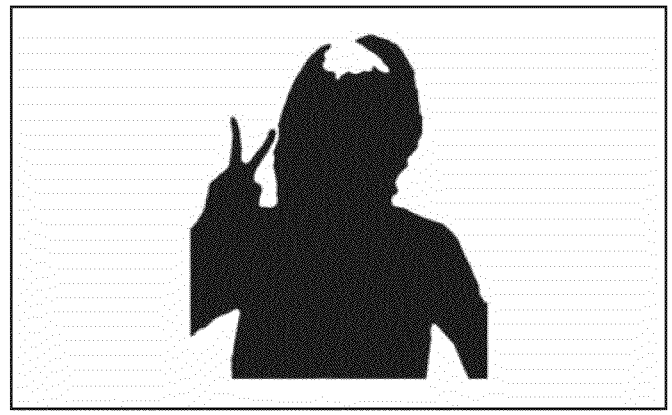
FIG. 23 shows additional examples of binary image maps at various stages of the method of FIG. 21.
Figure 23B:
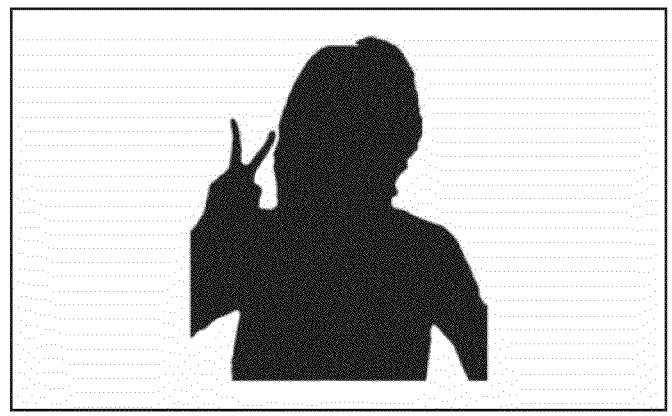
Figure 23C:
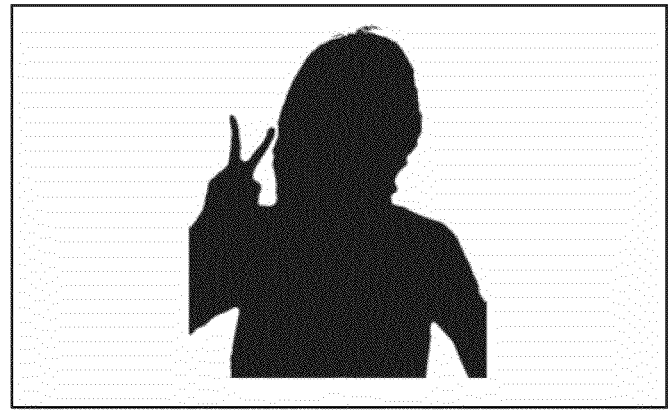

FIGS. 23*a*-*c* show graphical examples of a binary image map at various stages in the method of FIG. 21. FIG. 23*a* shows a single foreground object with a crown. FIG. 23*a*, might for example, be a representation of the binary image map after the hole filling described in block 2235 of FIG. 21. FIG. 23*b* shows the same image as FIG. 23*a* but with the crown filled. FIG. 23*b* might, for example, be a representation of the binary image map after the crown filling of block 2265 in FIG. 21. FIG. 23*c* shows the same image as FIG. 23*b* but with some additional background.

While aspects of certain embodiments have been explained using an image with a single foreground object with a single crown region, it should be apparent that the described techniques are extendable to include detecting and filling multiple crown regions within a single foreground object, or to detecting and filling one or more crown regions in more than one foreground object.

Further embodiments may include a method of distinguishing between foreground and background regions of a digital image of a scene, wherein the method comprises: (a) identifying in a binary image map comprising one or more foreground objects, a primary foreground object; (b) analyzing a head region of the primary foreground object to identify a trio line, wherein the trio line comprises a first group of one or more foreground pixels to the left of a group of background pixels and a second group of one or more foreground pixels to the right of the group of background pixels; (c) identifying, based at least in part on the trio line, a crown region of the binary image map; and (d) converting background pixels in the crown region of the binary image map to foreground pixels.

Certain embodiments may include a method of distinguishing between foreground and background regions of a digital image of a scene, wherein the method comprises: (a) storing a segmented image identifying foreground (FG) pixels and background (BG) pixels; (b) determining an orientation of the segmented image; (c) identifying in the image one or more groups of continuous foreground pixels; (d) identifying from the one or more groups of continuous foreground pixels, a candidate primary foreground object; (e) performing further analysis on the candidate primary foreground object to determine if the candidate primary foreground object is a primary foreground object; (f) determining based at least in part on the primary foreground object, a first set of boundaries, wherein the first set of boundaries comprises a left-most pixel of the primary foreground object, a right-most pixel of the primary foreground object, a top-most pixel of the primary foreground object, and a bottom-most pixel of the primary foreground object; (g) filling holes in the primary foreground object; (h) determining, based at least in part on the first set of boundaries, a second set of boundaries corresponding to a likely region of a head in the primary foreground object; (i) identifying within the second set of boundaries, a FG-BG-FG trio; (j) determining, at least based in part on the second set of boundaries and an identified FG-BG-FG trio, a third set of boundaries; (k) identifying in the third set of boundaries one or more groups of continuous background pixels; (l) identifying from the one or more groups of continuous background pixels, a candidate crown region; (m) performing further analysis on the candidate crown region to determine if the candidate crown region is an actual crown region; (n) converting background pixels within the crown region to foreground pixels; (o) and executing an edge detection algorithm, wherein a starting point for the edge detection algorithm is determined at least based in part on the FG-BG-FG trio.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above and below herein, as well as the background, invention summary, abstract and brief description of the drawings, are all incorporated by reference into the detailed description of the preferred embodiments as disclosing alternative embodiments.

The following are incorporated by reference: U.S. Pat. Nos. 7,403,643, 7,352,394, 6,407,777, 7,269,292, 7,308,156, 7,315,631, 7,336,821, 7,295,233, 6,571,003, 7,212,657, 7,039,222, 7,082,211, 7,184,578, 7,187,788, 6,639,685, 6,628,842, 6,256,058, 5,579,063, 6,480,300, 7,474,341 and 5,978,519;

U.S. published application nos. 2005/0041121, 2007/0110305, 2006/0204110, PCT/US2006/021393, 2005/0068452, 2006/0120599, 2006/0098890, 2006/0140455, 2006/0285754, 2008/0031498, 2007/0147820, 2007/0189748, 2008/0037840, 2007/0269108, 2007/0201724, 2002/0081003, 2003/0198384, 2006/0276698, 2004/0080631, 2008/0106615, 2006/0077261, 2004/0223063, 20050140801, 20080240555 and 2007/0071347; and U.S. patent application Ser. Nos. 10/764,339, 11/573,713, 11/462,035, 12/042,335, 12/063,089, 11/761,647, 11/753,098, 12/038,777, 12/043,025, 11/752,925, 11/767,412, 11/624,683, 60/829,127, 12/042,104, 11/856,721, 11/936,085, 12/142,773, 60/914,962, 12/038,147, 11/861,257, 12/026,484, 11/861,854, 61/024,551, 61/019,370, 61/023,946, 61/024,508, 61/023,774, 61/023,855, 11/319,766, and 11/673,560, 12/187,763, 12/192,335, 12/119,614, 12/043,025, 11/937,377 and 12/042,335.

What is claimed is:

1. A portable digital image capturing device having no photographic film, comprising:
   a flash for providing illumination during image acquisition;
   an optical system including a lens and an image sensor for capturing a main digital image;
   a half-face tracker for identifying only one or more half-face regions within a series of one or more relatively low resolution reference images, and predicting an approximate location of said one or more half-face regions within the main digital image;
   a half-face analyzer for determining one or more half-face regions in the vicinity of the approximate location within the main digital image predicted by the half-face tracker, each half-face region including only one eye and one or both of only a half nose or only a half mouth region; and
   a red-eye filter for modifying an area within the main digital image indicative of a red-eye phenomenon based on an analysis of the one or more half-face regions within the main digital image, each including at least one half-face region predicted by the half-face tracker.

2. The device of claim 1, wherein said red-eye filter is adapted based on a type of at least one of said one or more half-face regions identified within the digital image.

3. The device of claim 1, wherein the analysis is performed at least in part for determining said area.

4. The device of claim 1, wherein the analysis is performed at least in part for determining said modifying.

5. The device of claim 1, wherein at least one half-face region within the digital image is not among said one or more half face regions identified within the digital image that are analyzed.

6. The device of claim 1, wherein said analysis is performed in part on a full resolution half-face region and in part on a subsample resolution of at least one different half-face region.

7. The device of claim 1, wherein said modifying the area is performed on a full resolution of at least one-half-face region within the digital image.

8. The device of claim 1, wherein said red-eye filter comprises a plurality of subfilters.

9. The device of claim 1, further comprising:
   a pixel locator for locating pixels having a color indicative of the red-eye phenomenon;
   a shape analyzer for determining if a grouping of at least a portion of the pixels located by the pixel locator comprise a shape indicative of the red-eye phenomenon; and
   a pixel modifier for modifying the color of the pixels within the grouping.

10. The device of claim 9, further comprising a falsing analyzer for further processing the digital image in a vicinity of the grouping for details indicative of an eye, and for enabling the pixel modifier in response thereto.

11. The device of claim 9, further comprising an exposure analyzer for determining if the digital image was acquired in a condition indicative of the red-eye phenomenon.

12. A method of capturing and processing within a portable device a digital image including one or more half-face regions not exhibiting any red eye defect, comprising:
   acquiring a series of one or more relatively low resolution reference images;
   identifying only one or more half-face regions within the one or more relatively low resolution reference images each including only one eye and one or both of only a half nose or only a half mouth region;
   predicting an approximate location of each of the one or more half-face regions within a main digital image based on the identifying;
   capturing the main digital image with a portable device that includes a lens and an image sensor;

providing flash illumination during the capturing of the main digital image with the portable device;

determining and analyzing one or more half-face regions each in a vicinity of an approximate location within the main digital image based on the predicting, each including said only one eye and said one or both of only a half nose or only a half mouth region, within the main digital image, while foregoing within the main digital image analysis of at least one other half face region not including an eye; and modifying an area within the at least one half face region that is determined to be indicative of a red-eye phenomenon based on said analyzing.

13. The method of claim 12, further comprising adapting the modifying based on a type of said at least one partial face region.

14. The method of claim 12, further comprising determining said area based at least in part on the analyzing.

15. The method of claim 12, further comprising determining said modifying based at least in part on the analyzing.

16. The method of claim 12, wherein said analyzing is performed in part on a full resolution half-face region and in part on a subsample resolution of at least one different half-face region.

17. The method of claim 12, wherein said analyzing is performed on a subsample representation of at least one half-face region.

18. The method of claim 17, wherein said subsample representation comprises a subsample resolution representation.

19. The method of claim 12, wherein said modifying the area is performed on a full resolution of at least one half-face region within the image.

20. The method of claim 12, wherein the analyzing and modifying comprise:
  locating pixels having a color indicative of the red-eye phenomenon;
  determining if a grouping of at least a portion of the pixels located by the pixel locator comprise a shape indicative of the red-eye phenomenon; and
  modifying the color of the pixels within the grouping.

21. One or more processor-readable storage devices having code embedded therein for programming a processor to perform a method of capturing and processing within a portable device a digital image including one or more half-face regions not exhibiting any red eye defect, the method comprising:
  analyzing a series of one or more relatively low resolution reference images;
  identifying only one or more half-face regions within the one or more relatively low resolution reference images each including only one eye and one or both of only a half nose or only a half mouth region;
  predicting an approximate location of each of the one or more half-face regions within a main digital image based on the identifying;
  capturing the main digital image with a portable device that includes a lens and an image sensor;
  providing flash illumination during the capturing of the main digital image with the portable device;
  determining and analyzing one or more half-face regions each in a vicinity of an approximate location within the main digital image based on the predicting, each including said only one eye and said one or both of only a half nose or only a half mouth region, within the main digital image, while foregoing within the main digital image analysis of at least one other half face region not including an eye; and
  modifying an area within the at least one half face region that is determined to be indicative of a red-eye phenomenon based on said analyzing.

22. The one or more processor-readable storage devices of claim 21, wherein the method further comprises adapting the modifying based on a type of said at least one half-face region.

23. The one or more processor-readable storage devices of claim 21, wherein the method further comprises determining said area based at least in part on the analyzing.

24. The one or more processor-readable storage devices of claim 21, wherein the method further comprises determining said modifying based at least in part on the analyzing.

25. The one or more processor-readable storage devices of claim 21, wherein said analyzing is performed in part on a full resolution half-face region and in part on a subsample resolution of at least one different half-face region.

26. The one or more processor-readable storage devices of claim 21, wherein said analyzing is performed on a subsample representation of at least one half-face region.

27. The one or more processor-readable storage devices of claim 26, wherein said subsample representation comprises a subsample resolution representation.

28. The one or more processor-readable storage devices of claim 21, wherein said modifying the area is performed on a full resolution of at least one half-face region within the image.

29. The one or more processor-readable storage devices of claim 21, wherein the analyzing and modifying comprise:
  locating pixels having a color indicative of the red-eye phenomenon;
  determining if a grouping of at least a portion of the pixels located by the pixel locator comprise a shape indicative of the red-eye phenomenon; and
  modifying the color of the pixels within the grouping.

* * * * *